United States Patent
Mukherjee et al.

(10) Patent No.: US 11,601,644 B2
(45) Date of Patent: Mar. 7, 2023

(54) IMAGE AND VIDEO CODING USING MACHINE LEARNING PREDICTION CODING MODELS

(71) Applicant: GOOGLE LLC, Mountain View, CA (US)

(72) Inventors: Debargha Mukherjee, Cupertino, CA (US); Urvang Joshi, Mountain View, CA (US); Yue Chen, Kirkland, WA (US); Sarah Parker, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 455 days.

(21) Appl. No.: 16/295,176

(22) Filed: Mar. 7, 2019

(65) Prior Publication Data

US 2020/0186796 A1    Jun. 11, 2020

Related U.S. Application Data

(60) Provisional application No. 62/778,271, filed on Dec. 11, 2018.

(51) Int. Cl.
*H04N 19/107* (2014.01)
*H04N 19/105* (2014.01)
(Continued)

(52) U.S. Cl.
CPC ......... *H04N 19/107* (2014.11); *G06N 3/0454* (2013.01); *G06N 3/08* (2013.01);
(Continued)

(58) Field of Classification Search
None
See application file for complete search history.

(56) References Cited

U.S. PATENT DOCUMENTS

| 8,787,454 B1* | 7/2014 | Chechik | G06T 9/20 |
| | | | 375/240.08 |
| 2009/0110070 A1* | 4/2009 | Takahashi | H04N 19/60 |
| | | | 375/240.12 |

(Continued)

FOREIGN PATENT DOCUMENTS

WO    2018/199051 A1    11/2018

OTHER PUBLICATIONS

"Learning models for video quality prediction over wireless local area network and universal mobile telecommunication system networks" (Year: 2010).*

(Continued)

*Primary Examiner* — Mohammed Jebari
(74) *Attorney, Agent, or Firm* — Young Basile Hanlon & MacFarlane, P.C.

(57) ABSTRACT

Video coding may include generating, by a processor, a decoded frame by decoding a current frame from an encoded bitstream and outputting a reconstructed frame based on the decoded frame. Decoding includes identifying a current encoded block from the current frame, identifying a prediction coding model for the current block, wherein the prediction coding model is a machine learning prediction coding model from a plurality of machine learning prediction coding models, identifying reference values for decoding the current block based on the prediction coding model, obtaining prediction values based on the prediction coding model and the reference values, generating a decoded block corresponding to the current encoded block based on the prediction values, and including the decoded block in the decoded frame.

24 Claims, 19 Drawing Sheets

(51) Int. Cl.
| | |
|---|---|
| *H04N 19/154* | (2014.01) |
| *H04N 19/184* | (2014.01) |
| *G06N 20/00* | (2019.01) |
| *G06N 3/04* | (2006.01) |
| *G06N 3/08* | (2006.01) |

(52) U.S. Cl.
CPC ........... *G06N 20/00* (2019.01); *H04N 19/105* (2014.11); *H04N 19/154* (2014.11); *H04N 19/184* (2014.11)

(56) References Cited

U.S. PATENT DOCUMENTS

| | | | | |
|---|---|---|---|---|
| 2014/0355861 | A1* | 12/2014 | Nirenberg | G06K 9/4619 382/133 |
| 2017/0345130 | A1* | 11/2017 | Wang | G06T 3/4053 |
| 2018/0139458 | A1* | 5/2018 | Wang | H04N 19/17 |
| 2018/0184123 | A1* | 6/2018 | Terada | G06T 9/002 |
| 2018/0192046 | A1* | 7/2018 | Teo | H04N 19/82 |
| 2018/0249158 | A1* | 8/2018 | Huang | H04N 19/182 |
| 2018/0341862 | A1* | 11/2018 | Ehrman | G06N 20/00 |
| 2019/0294980 | A1* | 9/2019 | Laukien | G06N 20/00 |
| 2020/0059669 | A1* | 2/2020 | Nishi | H04N 19/192 |

OTHER PUBLICATIONS

"Methods for Objective and Subjective Video Quality Assessment and for Speech Enhancement" (Year: 2014).*
"On Bitstream Features Based Perceptual Quality Estimation of HEVC Coded Videos" (Year: 2015).*
International Search Report and Written Opinion of International Application No. PCT/US2019/059025 dated Jan. 15, 2020; 13 pages.
Thierry Dumas et al; "Context-adaptive neural network based prediction for image compression"; Cornell University Library, Jul. 2018; 16 Pages.
Birman Raz et al.; "Intra Prediction with Deep Learning"; Proceedings of Spie ISSN 0277-786X vol. 10524; Sep. 17, 2018; 9 Pages.
Wang et al; "A modular Neural Network Vector Predictor for Predictive Image Coding"; IEEE Transactions on Image Processing; IEEE Service Center; Aug. 1998; pp. 1198-1217.
Bankoski, et al., "Technical Overview of VP8, An Open Source Video Codec for the Web", Jul. 11, 2011, 6 pp.
Bankoski et al., "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Croup, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.

* cited by examiner

IMAGE AND VIDEO CODING USING MACHINE LEARNING PREDICTION CODING MODELS

BACKGROUND

Digital images and video can be used, for example, on the Internet, for remote business meetings via video conferencing, high definition video entertainment, video advertisements, or sharing of user-generated content. Due to the large amount of data involved in transferring and processing image and video data, high-performance compression may be advantageous for transmission and storage. Accordingly, it would be advantageous to provide high-resolution image and video transmitted over communications channels having limited bandwidth, such as image and video coding using machine learning prediction coding models.

SUMMARY

This application relates to encoding and decoding of image data, video stream data, or both for transmission or storage. Disclosed herein are aspects of systems, methods, and apparatuses for encoding and decoding using machine learning prediction coding models.

An aspect is a method for video decoding comprising generating, by a processor, a decoded frame by decoding a current frame from an encoded bitstream and outputting a reconstructed frame based on the decoded frame. Decoding includes identifying a current encoded block from the current frame, identifying a prediction coding model for the current block, wherein the prediction coding model is a machine learning prediction coding model from a plurality of machine learning prediction coding models, identifying reference values for decoding the current block based on the prediction coding model, obtaining prediction values based on the prediction coding model and the reference values, generating a decoded block corresponding to the current encoded block based on the prediction values, and including the decoded block in the decoded frame.

Another aspect is an apparatus for video decoding, the apparatus comprising a processor configured to generate a decoded frame by decoding a current frame from an encoded bitstream. The decoding includes identifying a current encoded block from the current frame, identifying a prediction coding model for the current block, wherein the prediction coding model is a machine learning prediction coding model from a plurality of machine learning prediction coding models, identifying reference values for decoding the current block based on the prediction coding model, obtaining prediction values based on the prediction coding model and the reference values, generating a decoded block corresponding to the current encoded block based on the prediction values, and including the decoded block in the decoded frame. The processor is configured to output a reconstructed frame based on the decoded frame.

Another aspect is a method for video decoding comprising generating, by a processor, a decoded frame by decoding a current frame from an encoded bitstream. The decoding includes identifying a current encoded block from the current frame, decoding a prediction coding model identifier form the encoded bitstream, identifying a prediction coding model for the current block based on the prediction coding model identifier, wherein the prediction coding model is a machine learning prediction coding model from a plurality of machine learning prediction coding models, identifying reference values for decoding the current block based on the prediction coding model, obtaining prediction values based on the prediction coding model and the reference values by using the reference values as input values for an artificial neural network corresponding to the prediction coding model such that the prediction values are output by the artificial neural network in response to the reference values, generating a decoded block corresponding to the current encoded block based on the prediction values, and including the decoded block in the decoded frame. The method includes outputting a reconstructed frame based on the decoded frame.

Another aspect is an apparatus for video decoding, the apparatus comprising a processor configured to generate a decoded frame by decoding a current frame from an encoded bitstream. The decoding includes identifying a current encoded block from the current frame, decoding a prediction coding model identifier form the encoded bitstream, identifying a prediction coding model for the current block based on the prediction coding model identifier, wherein the prediction coding model is a machine learning prediction coding model from a plurality of machine learning prediction coding models, identifying reference values for decoding the current block based on the prediction coding model, obtaining prediction values based on the prediction coding model and the reference values by using the reference values as input values for an artificial neural network corresponding to the prediction coding model such that the prediction values are output by the artificial neural network in response to the reference values, generating a decoded block corresponding to the current encoded block based on the prediction values, and including the decoded block in the decoded frame. The processor is configured to output a reconstructed frame based on the decoded frame.

Variations in these and other aspects will be described in additional detail hereafter.

BRIEF DESCRIPTION OF THE DRAWINGS

The description herein makes reference to the accompanying drawings wherein like reference numerals refer to like parts throughout the several views unless otherwise noted or otherwise clear from context.

DETAILED DESCRIPTION

Image and video compression schemes may include breaking an image, or frame, into smaller portions, such as blocks, and generating an output bitstream using techniques to limit the information included for each block in the output. In some implementations, the information included for each block in the output may be limited by reducing spatial redundancy, reducing temporal redundancy, or a combination thereof. For example, temporal or spatial redundancies may be reduced by predicting a frame, or a portion thereof, based on information available to both the encoder and decoder, and including information representing a difference, or residual, between the predicted frame and the original frame in the encoded bitstream. The residual information may be further compressed by transforming the residual information into transform coefficients, quantizing the transform coefficients, and entropy coding the quantized transform coefficients. Other coding information, such as motion information, may be included in the encoded bitstream, which may include transmitting differential information based on predictions of the encoding information, which may be entropy coded to further reduce the corresponding bandwidth utilization. An encoded bitstream can be decoded to recreate the blocks and the source images from the limited information. Prediction coding may include using ad-hoc prediction coding models, which may inaccurately predict the input data, which may limit coding efficiency.

Video coding using machine learning prediction coding models may improve the accuracy and efficiency of prediction coding by using automatically optimized prediction coding models, such as trained artificial neural network models in addition to, or instead of, the ad-hoc prediction coding models. Using machine learning prediction coding models may include training, or automatically optimizing, the machine learning prediction coding models by iteratively partitioning training data into training classes corresponding to the machine learning prediction coding models and training each machine learning prediction coding model based on a respective partition of the training data such that defined convergence criteria are satisfied.

Figure 1:
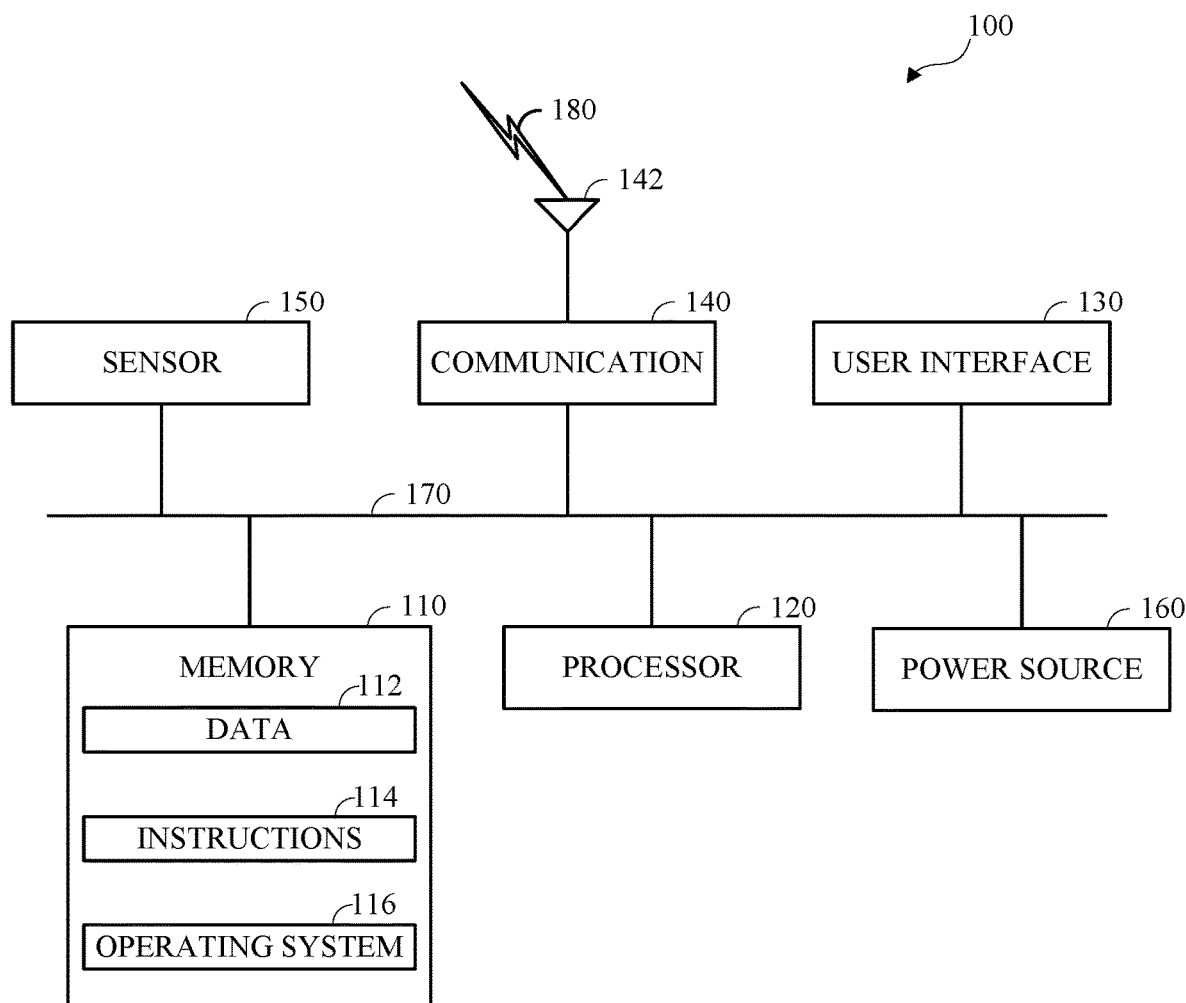
FIG. 1 is a diagram of a computing device in accordance with implementations of this disclosure.

FIG. 1 is a diagram of a computing device 100 in accordance with implementations of this disclosure. The computing device 100 shown includes a memory 110, a processor 120, a user interface (UI) 130, an electronic communication unit 140, a sensor 150, a power source 160, and a bus 170. As used herein, the term "computing device" includes any unit, or a combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one element or elements of the computing device 100 can be integrated into any number of separate physical units. For example, the user interface 130 and processor 120 can be integrated in a first physical unit and the memory 110 can be integrated in a second physical unit.

The memory 110 can include any non-transitory computer-usable or computer-readable medium, such as any tangible device that can, for example, contain, store, communicate, or transport data 112, instructions 114, an operating system 116, or any information associated therewith, for use by or in connection with other components of the computing device 100. The non-transitory computer-usable or computer-readable medium can be, for example, a solid state drive, a memory card, removable media, a read-only memory (ROM), a random-access memory (RAM), any type of disk including a hard disk, a floppy disk, an optical disk, a magnetic or optical card, an application-specific integrated circuits (ASICs), or any type of non-transitory media suitable for storing electronic information, or any combination thereof.

Although shown a single unit, the memory 110 may include multiple physical units, such as one or more primary memory units, such as random-access memory units, one or more secondary data storage units, such as disks, or a combination thereof. For example, the data 112, or a portion thereof, the instructions 114, or a portion thereof, or both, may be stored in a secondary storage unit and may be loaded or otherwise transferred to a primary storage unit in conjunction with processing the respective data 112, executing the respective instructions 114, or both. In some implementations, the memory 110, or a portion thereof, may be removable memory.

The data 112 can include information, such as input audio data, encoded audio data, decoded audio data, or the like. The instructions 114 can include directions, such as code, for performing any method, or any portion or portions thereof, disclosed herein. The instructions 114 can be realized in hardware, software, or any combination thereof. For example, the instructions 114 may be implemented as information stored in the memory 110, such as a computer program, that may be executed by the processor 120 to perform any of the respective methods, algorithms, aspects, or combinations thereof, as described herein.

Although shown as included in the memory 110, in some implementations, the instructions 114, or a portion thereof, may be implemented as a special purpose processor, or circuitry, that can include specialized hardware for carrying out any of the methods, algorithms, aspects, or combinations thereof, as described herein. Portions of the instructions 114 can be distributed across multiple processors on the same machine or different machines or across a network such as a local area network, a wide area network, the Internet, or a combination thereof.

The processor 120 can include any device or system capable of manipulating or processing a digital signal or other electronic information now-existing or hereafter developed, including optical processors, quantum processors, molecular processors, or a combination thereof. For example, the processor 120 can include a special purpose processor, a central processing unit (CPU), a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors.

The user interface 130 can include any unit capable of interfacing with a user, such as a virtual or physical keypad, a touchpad, a display, a touch display, a speaker, a microphone, a video camera, a sensor, or any combination thereof. For example, the user interface 130 may be an audio-visual display device, and the computing device 100 may present audio, such as decoded audio, using the user interface 130 audio-visual display device, such as in conjunction with displaying video, such as decoded video. Although shown as a single unit, the user interface 130 may include one or more physical units. For example, the user interface 130 may include an audio interface for performing audio communication with a user, and a touch display for performing visual and touch-based communication with the user.

The electronic communication unit 140 can transmit, receive, or transmit and receive signals via a wired or wireless electronic communication medium 180, such as a radio frequency (RF) communication medium, an ultraviolet (UV) communication medium, a visible light communication medium, a fiber optic communication medium, a wireline communication medium, or a combination thereof. For example, as shown, the electronic communication unit 140 is operatively connected to an electronic communication interface 142, such as an antenna, configured to communicate via wireless signals.

Although the electronic communication interface 142 is shown as a wireless antenna in FIG. 1, the electronic communication interface 142 can be a wireless antenna, as shown, a wired communication port, such as an Ethernet port, an infrared port, a serial port, or any other wired or wireless unit capable of interfacing with a wired or wireless electronic communication medium 180. Although FIG. 1 shows a single electronic communication unit 140 and a single electronic communication interface 142, any number of electronic communication units and any number of electronic communication interfaces can be used.

The sensor 150 may include, for example, an audio-sensing device, a visible light-sensing device, a motion sensing device, or a combination thereof. For example, the sensor 150 may include a sound-sensing device, such as a microphone, or any other sound-sensing device now existing or hereafter developed that can sense sounds in the proximity of the computing device 100, such as speech or other utterances, made by a user operating the computing device 100. In another example, the sensor 150 may include a camera, or any other image-sensing device now existing or hereafter developed that can sense an image such as the image of a user operating the computing device. Although a single sensor 150 is shown, the computing device 100 may include a number of sensors 150. For example, the computing device 100 may include a first camera oriented with a field of view directed toward a user of the computing device 100 and a second camera oriented with a field of view directed away from the user of the computing device 100.

The power source 160 can be any suitable device for powering the computing device 100. For example, the power source 160 can include a wired external power source interface; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 100. Although a single power source 160 is shown in FIG. 1, the computing device 100 may include multiple power sources 160, such as a battery and a wired external power source interface.

Although shown as separate units, the electronic communication unit 140, the electronic communication interface 142, the user interface 130, the power source 160, or portions thereof, may be configured as a combined unit. For example, the electronic communication unit 140, the electronic communication interface 142, the user interface 130, and the power source 160 may be implemented as a communications port capable of interfacing with an external display device, providing communications, power, or both.

One or more of the memory 110, the processor 120, the user interface 130, the electronic communication unit 140, the sensor 150, or the power source 160, may be operatively coupled via a bus 170. Although a single bus 170 is shown in FIG. 1, a computing device 100 may include multiple buses. For example, the memory 110, the processor 120, the user interface 130, the electronic communication unit 140, the sensor 150, and the bus 170 may receive power from the power source 160 via the bus 170. In another example, the memory 110, the processor 120, the user interface 130, the electronic communication unit 140, the sensor 150, the power source 160, or a combination thereof, may communicate data, such as by sending and receiving electronic signals, via the bus 170.

Although not shown separately in FIG. 1, one or more of the processor 120, the user interface 130, the electronic communication unit 140, the sensor 150, or the power source 160 may include internal memory, such as an internal buffer or register. For example, the processor 120 may include internal memory (not shown) and may read data 112 from the memory 110 into the internal memory (not shown) for processing.

Although shown as separate elements, the memory 110, the processor 120, the user interface 130, the electronic communication unit 140, the sensor 150, the power source 160, and the bus 170, or any combination thereof can be integrated in one or more electronic units, circuits, or chips.

Figure 2:
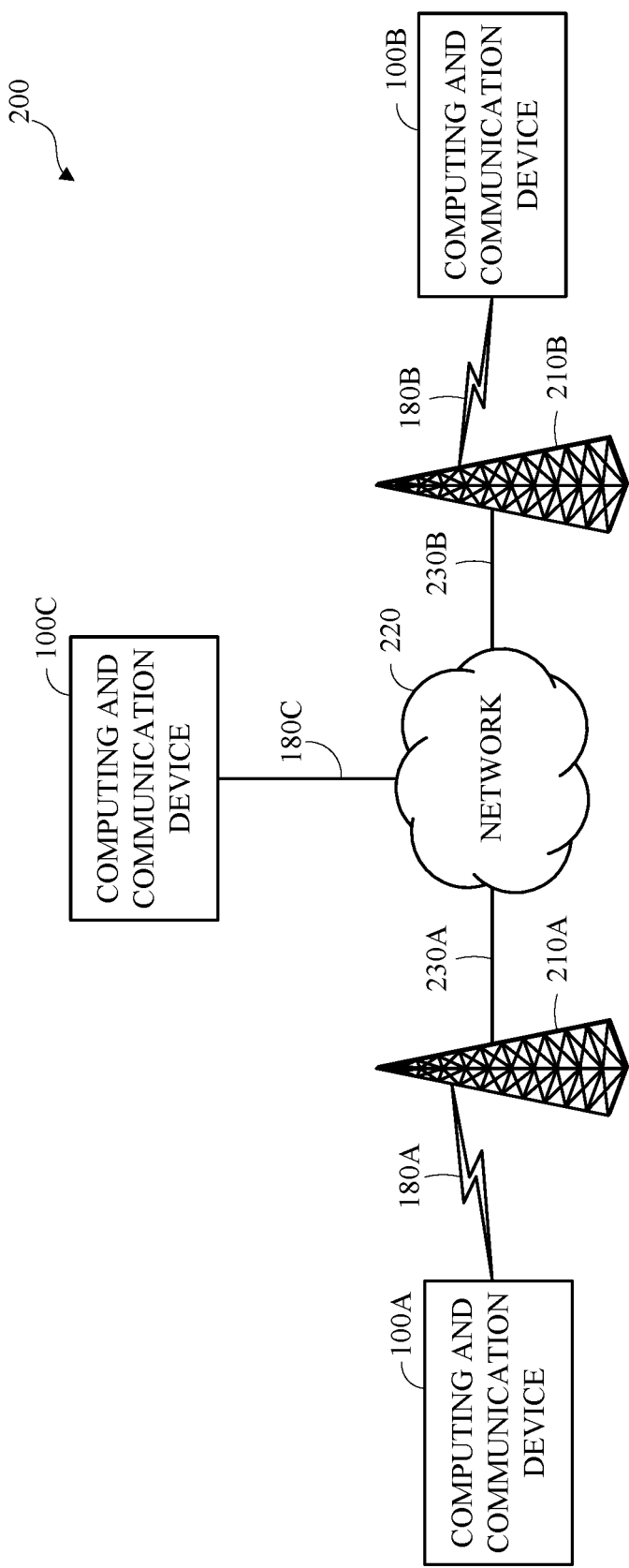
FIG. 2 is a diagram of a computing and communications system in accordance with implementations of this disclosure.

FIG. 2 is a diagram of a computing and communications system 200 in accordance with implementations of this disclosure. The computing and communications system 200 shown includes computing and communication devices 100A, 100B, 100C, access points 210A, 210B, and a network 220. For example, the computing and communication system 200 can be a multiple access system that provides communication, such as voice, audio, data, video, messaging, broadcast, or a combination thereof, to one or more wired or wireless communicating devices, such as the computing and communication devices 100A, 100B, 100C. Although, for simplicity, FIG. 2 shows three computing and communication devices 100A, 100B, 100C, two access points 210A, 210B, and one network 220, any number of computing and communication devices, access points, and networks can be used.

A computing and communication device 100A, 100B, 100C can be, for example, a computing device, such as the computing device 100 shown in FIG. 1. For example, the computing and communication devices 100A, 100B may be user devices, such as a mobile computing device, a laptop, a thin client, or a smartphone, and the computing and communication device 100C may be a server, such as a mainframe or a cluster. Although the computing and communication device 100A and the computing and communication device 100B are described as user devices, and the computing and communication device 100C is described as a server, any computing and communication device may perform some or all of the functions of a server, some or all of the functions of a user device, or some or all of the functions of a server and a user device. For example, the server computing and communication device 100C may receive, encode, process, store, transmit, or a combination thereof audio data and one or both of the computing and communication device 100A and the computing and communication device 100B may receive, decode, process, store, present, or a combination thereof the audio data.

Each computing and communication device 100A, 100B, 100C, which may include a user equipment (UE), a mobile station, a fixed or mobile subscriber unit, a cellular telephone, a personal computer, a tablet computer, a server, consumer electronics, or any similar device, can be configured to perform wired or wireless communication, such as via the network 220. For example, the computing and communication devices 100A, 100B, 100C can be configured to transmit or receive wired or wireless communication signals. Although each computing and communication device 100A, 100B, 100C is shown as a single unit, a computing and communication device can include any number of interconnected elements.

Each access point 210A, 210B can be any type of device configured to communicate with a computing and communication device 100A, 100B, 100C, a network 220, or both via a wired or wireless communication links 180A, 180B, 180C. For example, an access point 210A, 210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A, 210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the HyperText Transport Protocol (HTTP), or a combination thereof.

The computing and communication devices 100A, 100B, 100C can communicate with each other via the network 220 using one or more a wired or wireless communication links, or via a combination of wired and wireless communication links. For example, as shown the computing and communication devices 100A, 100B can communicate via wireless communication links 180A, 180B, and computing and communication device 100C can communicate via a wired communication link 180C. Any of the computing and communication devices 100A, 100B, 100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A, 210B can communicate with the network 220 via one or more types of wired or wireless communication links 230A, 230B. Although FIG. 2 shows the computing and communication devices 100A, 100B, 100C in communication via the network 220, the computing and communication devices 100A, 100B, 100C can communicate with each other via any number of communication links, such as a direct wired or wireless communication link.

In some implementations, communications between one or more of the computing and communication device 100A, 100B, 100C may omit communicating via the network 220 and may include transferring data via another medium (not shown), such as a data storage device. For example, the server computing and communication device 100C may store audio data, such as encoded audio data, in a data storage device, such as a portable data storage unit, and one or both of the computing and communication device 100A or the computing and communication device 100B may access, read, or retrieve the stored audio data from the data storage unit, such as by physically disconnecting the data storage device from the server computing and communication device 100C and physically connecting the data storage device to the computing and communication device 100A or the computing and communication device 100B.

Other implementations of the computing and communications system 200 are possible. For example, in an implementation, the network 220 can be an ad-hoc network and can omit one or more of the access points 210A, 210B. The computing and communications system 200 may include devices, units, or elements not shown in FIG. 2. For example, the computing and communications system 200 may include many more communicating devices, networks, and access points.

Figure 3:
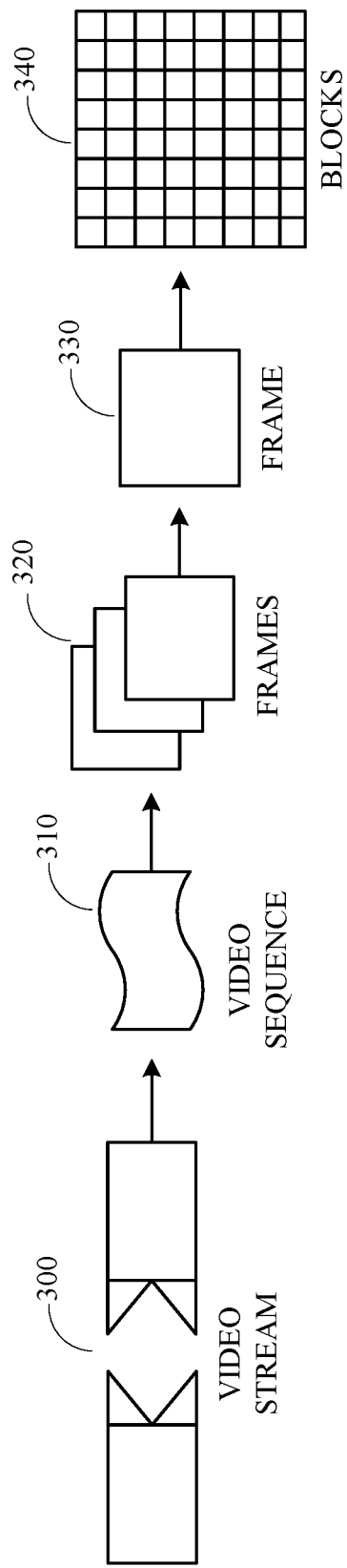
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320.

Each frame 330 from the adjacent frames 320 may represent a single image from the video stream. Although not shown in FIG. 3, a frame 330 may include one or more segments, tiles, or planes, which may be coded, or otherwise processed, independently, such as in parallel. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
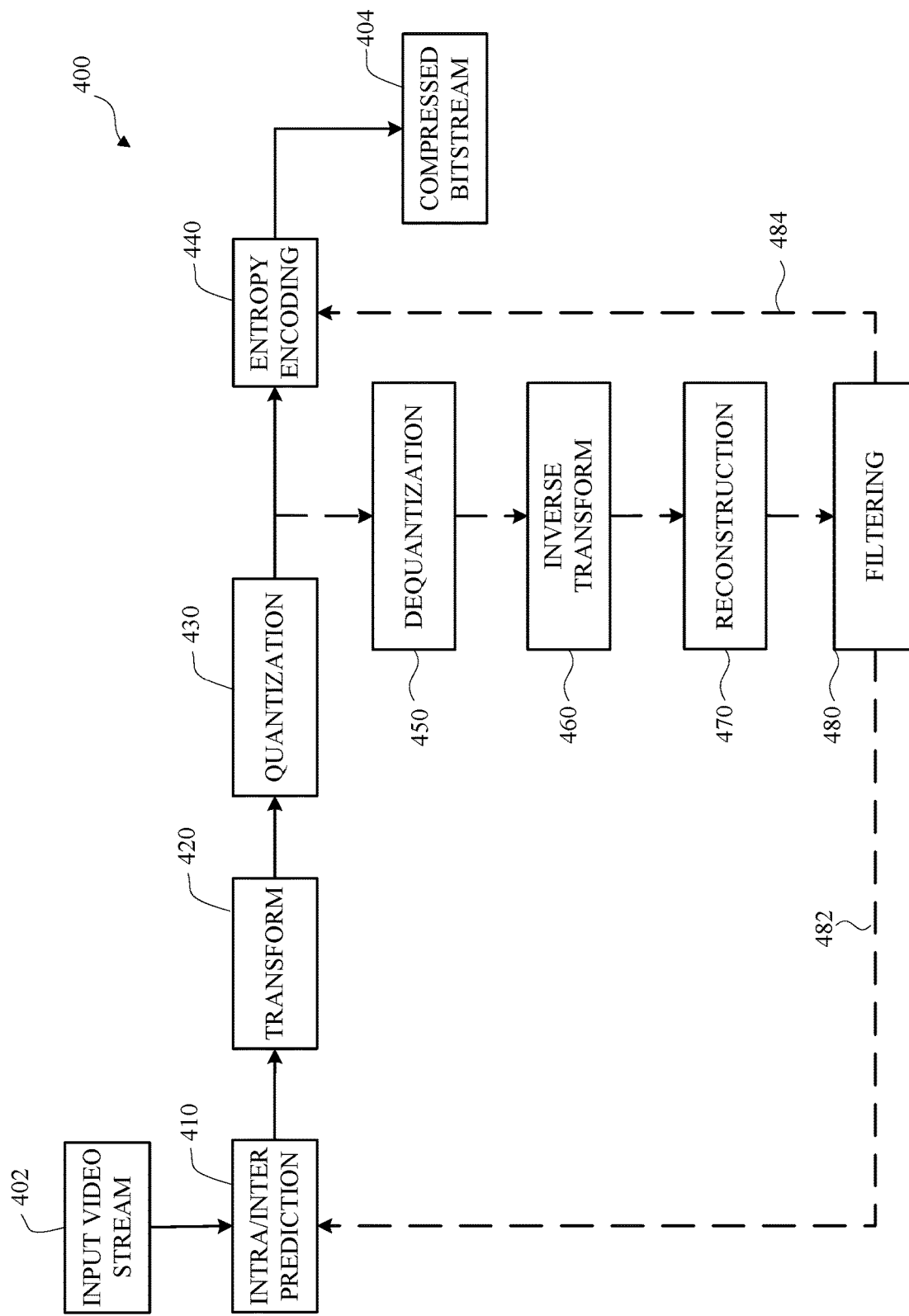
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3, to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference portion of the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), the Singular Value Decomposition Transform (SVD), and the Asymmetric Discrete Sine Transform (ADST). In an example, the DCT may include transforming a block into the frequency domain. The DCT may include using transform coefficient values based on spatial frequency, with the lowest frequency (i.e. DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
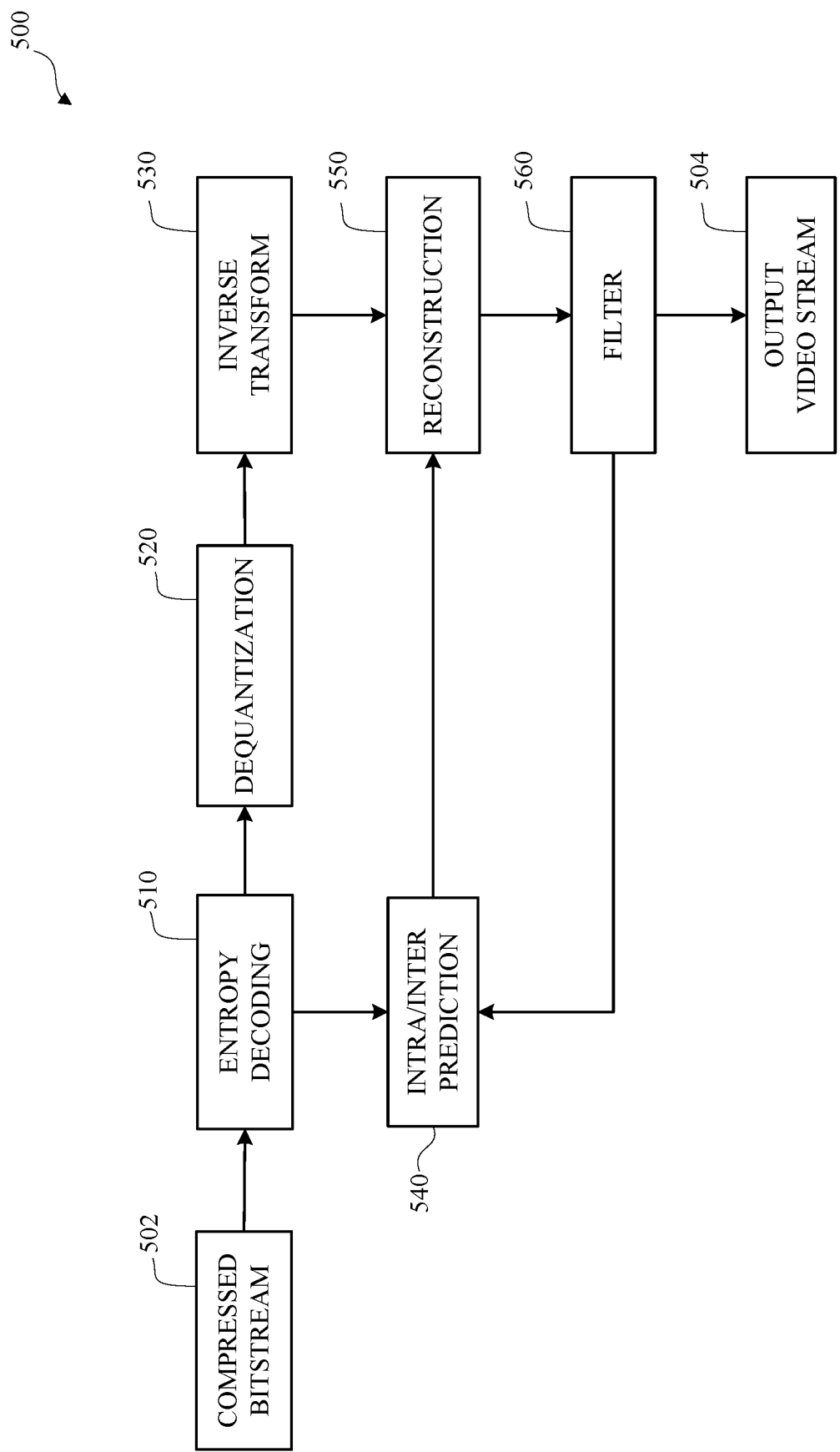
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below and may include decoding the encoded frame, or a portion thereof, which may include decoding an encoded block, which may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a decoded block. The filtering unit 480 can be applied to the decoded block to generate a reconstructed block, which may reduce distortion, such as blocking artifacts. Although one filtering unit 480 is shown in FIG. 4, filtering the decoded block may include loop filtering, deblocking filtering, or other types of filtering or combinations of types of filtering. The reconstructed block may be stored or otherwise made accessible as a reconstructed block, which may be a portion of a reference frame, for encoding another portion of the current frame, another frame, or both, as indicated by the broken line at 482. Coding information, such as deblocking threshold index values, for the frame may be encoded, included in the compressed bitstream 404, or both, as indicated by the broken line at 484.

Other variations of the encoder 400 can be used to encode the compressed bitstream 404. For example, a non-transform-based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to decode video data as described herein. The decoder 500 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a filtering unit 560, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond to the derivative residual block generated by the inverse transform unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a decoded block. The filtering unit 560 can be applied to the decoded block to reduce artifacts, such as blocking artifacts, which may include loop filtering, deblocking filtering, or other types of filtering or combinations of types of filtering, and which may include generating a reconstructed block, which may be output as the output video stream 504.

Other variations of the decoder 500 can be used to decode the compressed bitstream 502. For example, the decoder 500 can produce the output video stream 504 without the deblocking filtering unit 570.

Figure 6:
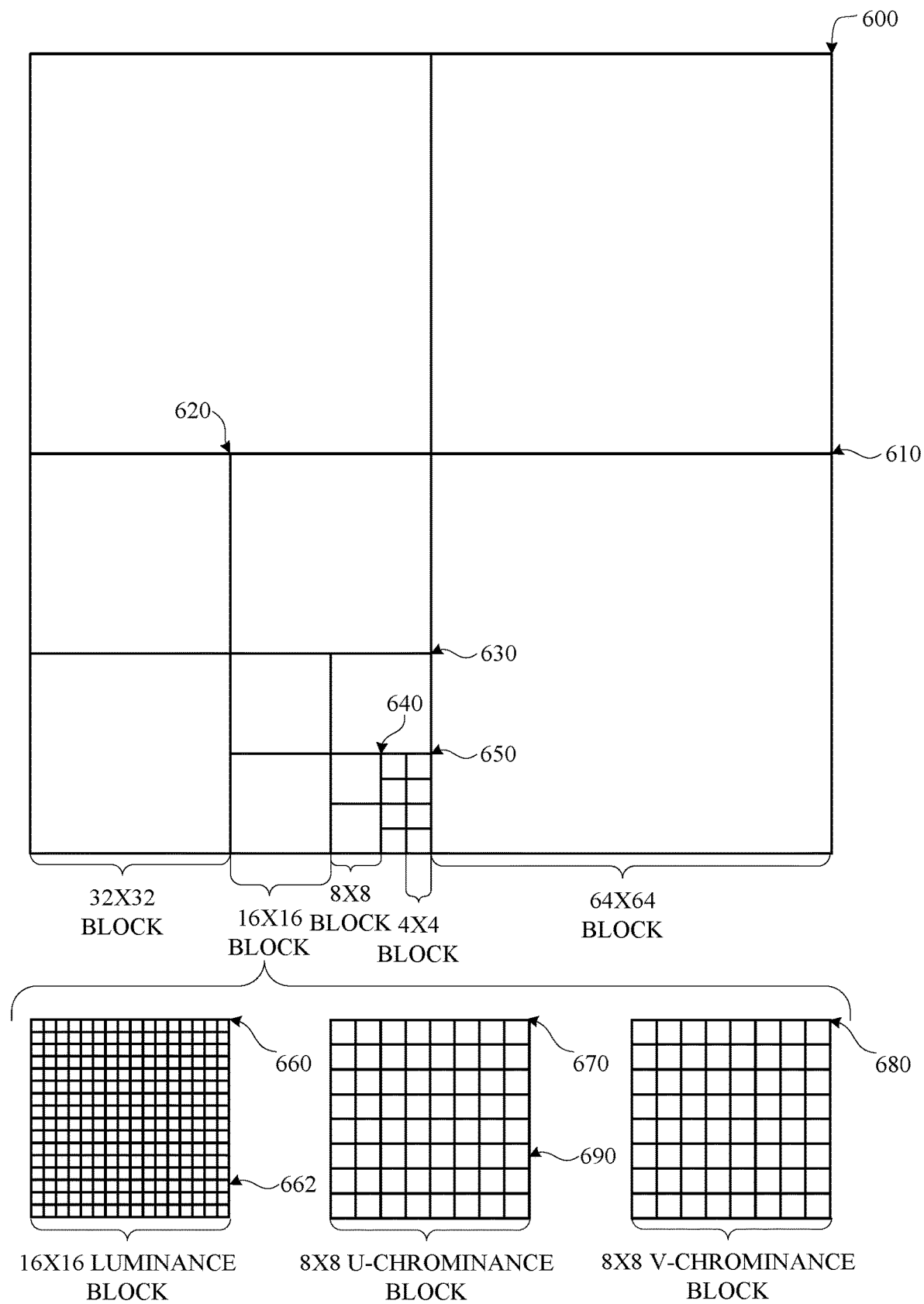
FIG. 6 is a block diagram of a representation of a portion of a frame in accordance with implementations of this disclosure.

FIG. 6 is a block diagram of a representation of a portion 600 of a frame, such as the frame 330 shown in FIG. 3, in accordance with implementations of this disclosure. As shown, the portion 600 of the frame includes four 64×64 blocks 610, in two rows and two columns in a matrix or Cartesian plane. In some implementations, a 64×64 block may be a maximum coding unit, N=64. Each 64×64 block may include four 32×32 blocks 620. Each 32×32 block may include four 16×16 blocks 630. Each 16×16 block may include four 8×8 blocks 640. Each 8×8 block 640 may include four 4×4 blocks 650. Each 4×4 block 650 may include 16 pixels, which may be represented in four rows and four columns in each respective block in the Cartesian plane or matrix. The pixels may include information representing an image captured in the frame, such as luminance information, color information, and location information. In some implementations, a block, such as a 16×16 pixel block as shown, may include a luminance block 660, which may include luminance pixels 662; and two chrominance blocks 670, 680, such as a U or Cb chrominance block 670, and a V or Cr chrominance block 680. The chrominance blocks 670, 680 may include chrominance pixels 690. For example, the luminance block 660 may include 16×16 luminance pixels 662 and each chrominance block 670, 680 may include 8×8 chrominance pixels 690 as shown. Although one arrangement of blocks is shown, any arrangement may be used. Although FIG. 6 shows N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof may be used.

In some implementations, video coding may include ordered block-level coding. Ordered block-level coding may include coding blocks of a frame in an order, such as raster-scan order, wherein blocks may be identified and processed starting with a block in the upper left corner of the frame, or portion of the frame, and proceeding along rows from left to right and from the top row to the bottom row, identifying each block in turn for processing. For example, the 64×64 block in the top row and left column of a frame may be the first block coded and the 64×64 block immediately to the right of the first block may be the second block coded. The second row from the top may be the second row coded, such that the 64×64 block in the left column of the second row may be coded after the 64×64 block in the rightmost column of the first row.

In some implementations, coding a block may include using quad-tree coding, which may include coding smaller block units within a block in raster-scan order. For example, the 64×64 block shown in the bottom left corner of the portion of the frame shown in FIG. 6, may be coded using quad-tree coding wherein the top left 32×32 block may be coded, then the top right 32×32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded. Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

In some implementations, video coding may include compressing the information included in an original, or input, frame by, for example, omitting some of the information in the original frame from a corresponding encoded frame. For example, coding may include reducing spectral redundancy, reducing spatial redundancy, reducing temporal redundancy, or a combination thereof.

In some implementations, reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of a frame and using a relatively small amount of information to represent each corresponding chrominance component for the portion of the frame. For example, a portion of a frame may be represented by a high-resolution luminance component, which may include a 16×16 block of pixels, and by two lower resolution chrominance components, each of which represents the portion of the frame as an 8×8 block of pixels. A pixel may indicate a value, for example, a value in the range from 0 to 255, and may be stored or transmitted using, for example, eight bits. Although this disclosure is described in reference to the YUV color model, any color model may be used.

In some implementations, reducing spatial redundancy may include transforming a block into the frequency domain using, for example, a discrete cosine transform (DCT). For example, a unit of an encoder, such as the transform unit 420 shown in FIG. 4, may perform a DCT using transform coefficient values based on spatial frequency.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to block or pixel of a reference frame at a different spatial location and reducing temporal redundancy may include generating motion information indicating the spatial difference, or translation, between the location of the block or pixel in the current frame and corresponding location of the block or pixel in the reference frame.

In some implementations, reducing temporal redundancy may include identifying a portion of a reference frame that corresponds to a current block or pixel of a current frame. For example, a reference frame, or a portion of a reference frame, which may be stored in memory, may be searched to identify a portion for generating a prediction to use for encoding a current block or pixel of the current frame with maximal efficiency. For example, the search may identify a portion of the reference frame for which the difference in pixel values between the current block and a prediction block generated based on the portion of the reference frame is minimized and may be referred to as motion searching. In some implementations, the portion of the reference frame searched may be limited. For example, the portion of the reference frame searched, which may be referred to as the search area, may include a limited number of rows of the reference frame. In an example, identifying the portion of the reference frame for generating a prediction may include calculating a cost function, such as a sum of absolute differences (SAD), between the pixels of portions of the search area and the pixels of the current block.

In some implementations, the spatial difference between the location of the portion of the reference frame for generating a prediction in the reference frame and the current block in the current frame may be represented as a motion vector. The difference in pixel values between the prediction block and the current block may be referred to as differential data, residual data, a prediction error, or as a residual block. In some implementations, generating motion vectors may be referred to as motion estimation, and a pixel of a current block may be indicated based on location using Cartesian coordinates as $f_{x,y}$. Similarly, a pixel of the search area of the reference frame may be indicated based on location using Cartesian coordinates as $r_{x,y}$. A motion vector (MV) for the current block may be determined based on, for example, a SAD between the pixels of the current frame and the corresponding pixels of the reference frame.

Although described herein with reference to matrix or Cartesian representation of a frame for clarity, a frame may be stored, transmitted, processed, or any combination thereof, in any data structure such that pixel values may be efficiently represented for a frame or image. For example, a frame may be stored, transmitted, processed, or any combination thereof, in a two-dimensional data structure such as a matrix as shown, or in a one-dimensional data structure, such as a vector array. In an implementation, a representation of the frame, such as a two-dimensional representation as shown, may correspond to a physical location in a rendering of the frame as an image. For example, a location in the top left corner of a block in the top left corner of the frame may correspond with a physical location in the top left corner of a rendering of the frame as an image.

In some implementations, block-based coding efficiency may be improved by partitioning input blocks into one or more prediction partitions, which may be rectangular, including square, partitions for prediction coding. In some implementations, video coding using prediction partitioning may include selecting a prediction partitioning scheme from among multiple candidate prediction partitioning schemes. For example, in some implementations, candidate prediction partitioning schemes for a 64×64 coding unit may include rectangular size prediction partitions ranging in sizes from 4×4 to 64×64, such as 4×4, 4×8, 8×4, 8×8, 8×16, 16×8, 16×16, 16×32, 32×16, 32×32, 32×64, 64×32, or 64×64. In some implementations, video coding using prediction partitioning may include a full prediction partition search, which may include selecting a prediction partitioning scheme by encoding the coding unit using each available candidate prediction partitioning scheme and selecting the best scheme, such as the scheme that produces the least rate-distortion error.

In some implementations, encoding a video frame may include identifying a prediction partitioning scheme for encoding a current block, such as block 610. In some implementations, identifying a prediction partitioning scheme may include determining whether to encode the block as a single prediction partition of maximum coding unit size, which may be 64×64 as shown, or to partition the block into multiple prediction partitions, which may correspond with the sub-blocks, such as the 32×32 blocks 620 the 16×16 blocks 630, or the 8×8 blocks 640, as shown, and may include determining whether to partition into one or more smaller prediction partitions. For example, a 64×64 block may be partitioned into four 32×32 prediction partitions. Three of the four 32×32 prediction partitions may be encoded as 32×32 prediction partitions and the fourth 32×32 prediction partition may be further partitioned into four 16×16 prediction partitions. Three of the four 16×16 prediction partitions may be encoded as 16×16 prediction partitions and the fourth 16×16 prediction partition may be further partitioned into four 8×8 prediction partitions, each of which may be encoded as an 8×8 prediction partition. In some implementations, identifying the prediction partitioning scheme may include using a prediction partitioning decision tree.

In some implementations, video coding for a current block may include identifying an optimal prediction coding mode from multiple candidate prediction coding modes, which may provide flexibility in handling video signals with various statistical properties and may improve the compression efficiency. For example, a video coder may evaluate each candidate prediction coding mode to identify the optimal prediction coding mode, which may be, for example, the prediction coding mode that minimizes an error metric, such as a rate-distortion cost, for the current block. In some implementations, the complexity of searching the candidate prediction coding modes may be reduced by limiting the set of available candidate prediction coding modes based on similarities between the current block and a corresponding prediction block. In some implementations, the complexity of searching each candidate prediction coding mode may be reduced by performing a directed refinement mode search. For example, metrics may be generated for a limited set of candidate block sizes, such as 16×16, 8×8, and 4×4, the error metric associated with each block size may be in descending order, and additional candidate block sizes, such as 4×8 and 8×4 block sizes, may be evaluated.

In some implementations, block-based coding efficiency may be improved by partitioning a current residual block into one or more transform partitions, which may be rectangular, including square, partitions for transform coding. In some implementations, video coding using transform partitioning may include selecting a uniform transform partitioning scheme. For example, a current residual block, such as block 610, may be a 64×64 block and may be transformed without partitioning using a 64×64 transform.

Although not expressly shown in FIG. 6, a residual block may be transform partitioned using a uniform transform partitioning scheme. For example, a 64×64 residual block may be transform partitioned using a uniform transform partitioning scheme including four 32×32 transform blocks, using a uniform transform partitioning scheme including sixteen 16×16 transform blocks, using a uniform transform partitioning scheme including sixty-four 8×8 transform blocks, or using a uniform transform partitioning scheme including 256 4×4 transform blocks.

In some implementations, video coding using transform partitioning may include identifying multiple transform block sizes for a residual block using multiform transform partition coding. In some implementations, multiform transform partition coding may include recursively determining whether to transform a current block using a current block size transform or by partitioning the current block and multiform transform partition coding each partition. For example, the bottom left block 610 shown in FIG. 6 may be a 64×64 residual block, and multiform transform partition coding may include determining whether to code the current 64×64 residual block using a 64×64 transform or to code the 64×64 residual block by partitioning the 64×64 residual block into partitions, such as four 32×32 blocks 620, and multiform transform partition coding each partition. In some implementations, determining whether to transform partition the current block may be based on comparing a cost for encoding the current block using a current block size transform to a sum of costs for encoding each partition using partition size transforms.

Figure 7:
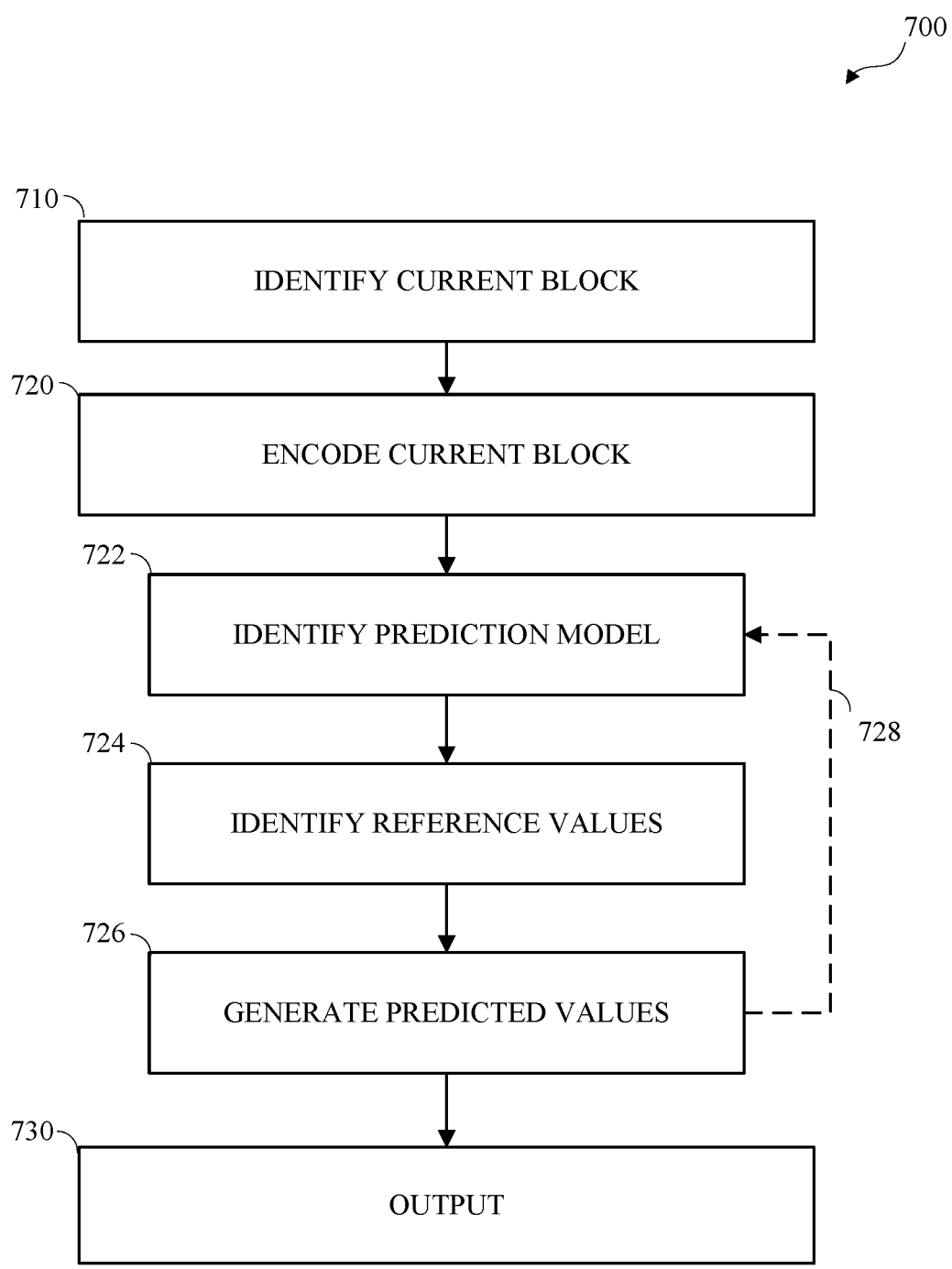
FIG. 7 is a flowchart diagram of an example of encoding using machine learning prediction coding models in accordance with implementations of this disclosure.

FIG. 7 is a flowchart diagram of an example of encoding using machine learning prediction coding models 700 in accordance with implementations of this disclosure. Encoding using machine learning prediction coding models 700 may be implemented in an encoder, such as the encoder 400 shown in FIG. 4. For example, the intra/inter prediction unit 410 of the encoder 400 shown in FIG. 4 may implement encoding using machine learning prediction coding models 700.

Encoding using machine learning prediction coding models 700 may include identifying a current block at 710, generating an encoded block by encoding the current block at 720, and outputting the encoded block at 730.

The current block may be identified at 710. Identifying the current block may include identifying a current frame, such as an input frame, and identifying the current block from the current frame. For example, the current block may be a block, such as one of the blocks 610, 620, 630, 640, 650 shown in FIG. 6. The current block may be identified according to a block scan order. In some implementations, identifying the current block at 710 may include identifying a tile from the current frame and identifying the current block from the tile. Although encoding using machine learning prediction coding models 700 is described with reference to forward raster scan order, any block scan order may be used.

An encoded block may be generated at 720 by encoding the current block identified at 710. Encoding the current block at 720 may include generating a prediction block for the current block, which may include identifying a prediction model at 722, identifying reference pixel values at 724, and generating prediction values at 726.

Identifying the prediction model at 722 may include identifying a prediction mode, such as an intra-prediction coding mode, an inter-prediction coding mode, or a compound prediction coding mode, such as an inter-inter mode or an inter-intra mode. Encoding using an inter-inter coding mode may include combining multiple inter-prediction generated predictions. Encoding using an inter-intra coding mode may include combining inter-prediction generated predictions with intra-prediction generated predictions. Identifying the prediction mode at 722 may include identifying the prediction mode from a set of candidate prediction modes.

Identifying the prediction model at 722 may include identifying an automatically optimized coding model, which may be a machine learning or artificial intelligence coding model, such as an artificial neural network prediction coding model. For example, an artificial neural network prediction coding model may receive, as input, reference values (x) for an input set {x, z}, which may correspond to a current block (z) and may output prediction values ($z_p$) for the current block (z) of the input set {x, z}. The artificial neural network model may implement a neural network function fnn( ) for generating the prediction values ($z_p$) corresponding to the input pixel values (p) for a current block (z) of the input set {x, z} based on the reference values (x), which may be expressed as the following:

$$z_p = fnn(x).$$

An artificial neural network model may describe nodes, or artificial neurons. A node in an artificial neural network may be expressed as a mathematical function, which may include describing or defining one or more parameters or thresholds for the node. A node in an artificial neural network may receive one or more input signals, determine an internal state subsequent to, or in accordance with, receiving the input signals (activation), and output an output signal based on the input signals and the internal state. The input signals may be associated with respective weighting values. The artificial neural network model may describe or define the weighting values. For example, determining the internal state may include determining a weighted sum of the input signals, transforming the sum, such as using an activation or transform function, which may be a non-linear function, and outputting the transformation result, or a function (output function) thereof.

The artificial neural network model may describe layers for organizing and arranging the nodes in the artificial neural network, such as an input layer, an output layer, and zero or more intermediate, internal, or hidden layers. The nodes of the artificial neural network input layer (input nodes) may receive the artificial neural network input data, such as the reference values (x). Nodes in adjacent layers may be interconnected along edges. The artificial neural network model may describe or define weighting values associated with respective edges. The output nodes in the output layer of the artificial neural network may output prediction values based on the received input reference values. For example, for a 4×4 block the input layer may include a defined cardinality of input notes, such as nine input nodes, for receiving the reference values (x), such as nine reference values, and the output layer may include a defined cardinality of output nodes, such as 16 output nodes corresponding to the 16 prediction values ($z_p$) for the 16 pixels of the current block.

As an example, an artificial neural network intra-prediction coding model may be a fully connected artificial neural network including a defined cardinality, such as two or three, layers, which may include an input layer having a cardinality of nodes, or artificial neurons, corresponding to the cardinality of the reference values (x), or features, for an input set $\{x, z\}$.

Although encoding using an artificial neural network encoding mode model is described herein with referenced to intra-prediction coding, encoding using an artificial neural network encoding mode model may be used for other types of prediction coding. For example, an artificial neural network compound prediction coding model may include a convolutional neural network, or a combination of a convolutional neural network and a fully connected artificial neural network, wherein the input (x) may be decomposed into respective reference data sets $(x_1, x_2)$.

Figure 19:
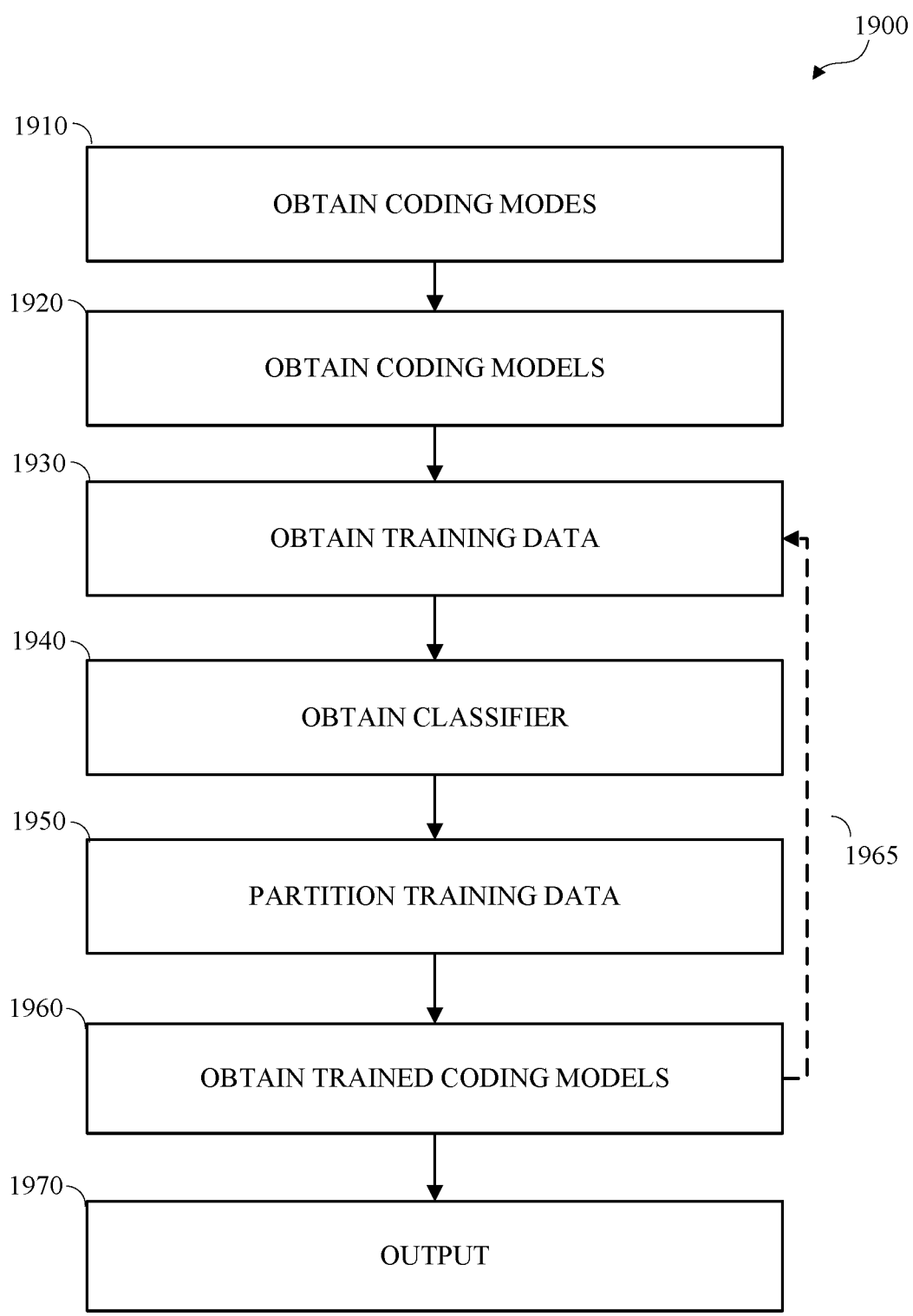
FIG. 19 is a flowchart diagram of an example of machine learning prediction coding models in accordance with implementations of this disclosure.

Encoding, or decoding, using an artificial neural network prediction coding model may include instantiating or operating an instance of an artificial neural network described by the artificial neural network model. Encoding using machine learning prediction coding models 700 may include generating the artificial neural network models. An example of generating artificial neural network models is shown in FIG. 19.

The available reference values may be identified at 724. For example, the prediction model identified at 722 may be an intra-prediction model and identifying the available reference values at 724 may include identifying the prediction values based on available reference values that correspond to pixels spatially proximate to, such as adjacent to or neighboring, the current block from the current frame, such as values of previously predicted, encoded, decoded, and reconstructed pixels. In another example, the prediction model identified at 722 may be an inter-prediction model and identifying the available reference values at 724 may include identifying the prediction values based on available reference values, such as values of previously predicted, encoded, decoded, and reconstructed pixels, determined based on a reference fame other than the current frame. In another example, the prediction model identified at 722 may be a compound inter-inter-prediction model and identifying the available reference values at 724 may include generating the prediction values based on available reference values, such as values of previously predicted, encoded, decoded, and reconstructed pixels, determined based on multiple reference frames other than the current frame. In another example, the prediction model identified at 722 may be a compound inter-intra-prediction model and identifying the available reference values at 724 may include generating the prediction values, such as values of previously predicted, encoded, decoded, and reconstructed pixels, based on available reference values determined based on the current frame and based on a reference fame other than the current frame.

Prediction values may be generated at 726 based on the prediction model identified at 722 and the available reference values identified at 724. For example, generating prediction values at 726 based on the artificial neural network prediction coding model identified at 722 and the available reference values identified at 724 may include determining a prediction value for each pixel of the current block by inputting the available reference values identified at 724 to the artificial neural network prediction coding model identified at 722 and obtaining the output of the artificial neural network prediction coding models identified at 722 as the prediction values.

In some implementations, generating an encoded block at 720 by encoding the current block identified at 710 may include evaluating multiple candidate prediction modes as indicated by the broken line at 728. Evaluating multiple candidate prediction modes may include for each candidate prediction mode from the candidate prediction modes, identifying the candidate prediction mode at 722, identifying reference values at 724, generating prediction values at 726, and determining an efficiency metric based on the prediction values (not shown). The efficiency metric may indicate, for example, a measure of prediction accuracy, such as a sum of absolute differences (SAD), between the prediction values and the pixels of the current block. The candidate prediction mode corresponding to the minimal efficiency metric may be identified as the prediction mode for the current block, and the corresponding prediction block may be used as the prediction block.

Although not shown expressly in FIG. 7, generating an encoded block by encoding the current encoded block at 720 may include performing other elements of video encoding, such as transformation by a transform unit, such as the transform unit 420 shown in FIG. 4, quantization by a quantization unit, such as the quantization unit 430 shown in FIG. 4, entropy coding by an entropy coding unit, such as the entropy coding unit 440 shown in FIG. 4, dequantization by a dequantization unit, such as the dequantization unit 450 shown in FIG. 4, inverse transformation by an inverse transform unit, such as the inverse transform unit 460 shown in FIG. 4, reconstruction by a reconstruction unit, such as the reconstruction unit 470 shown in FIG. 4, or any other aspect of video coding.

Information identifying the prediction mode, the encoded block, or both may be output at 730. For example, a prediction mode indicator, such as an index value, corresponding to the prediction mode identified at 722 may be included in an output bitstream, such as in a header for the block.

Other implementations of encoding using machine learning prediction coding models 700 are available. For example, other classes of artificial neural networks may be used. In some implementations, additional elements of encoding using machine learning prediction coding models can be added, certain elements can be combined, and/or certain elements can be removed.

Figure 8:
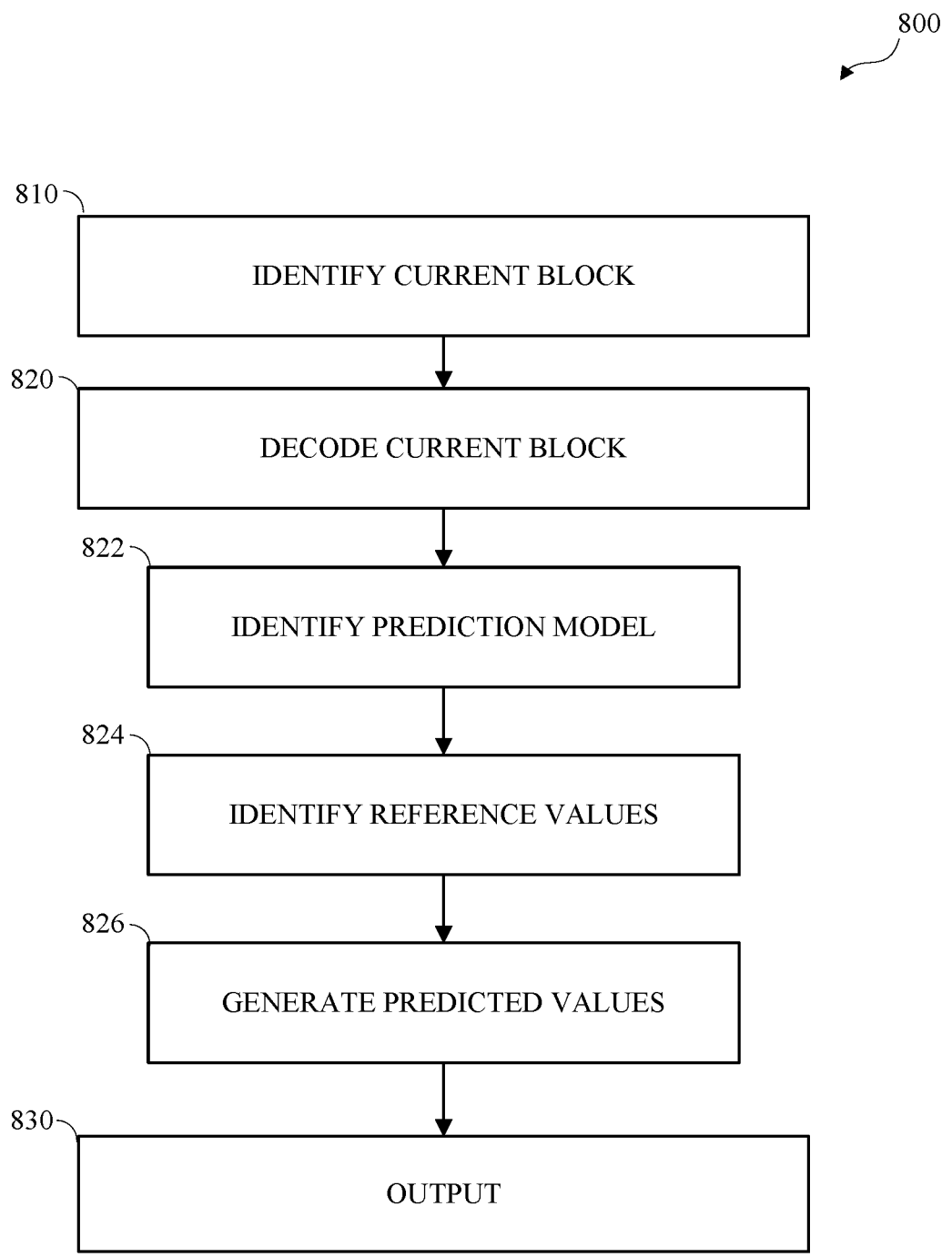
FIG. 8 is a flowchart diagram of an example of decoding using machine learning prediction coding models in accordance with implementations of this disclosure.

FIG. 8 is a flowchart diagram of an example of decoding using machine learning prediction coding models 800 in accordance with implementations of this disclosure. Decoding using machine learning prediction coding models 800 may be implemented in a decoder, such as the decoder 500 shown in FIG. 5. For example, the intra/inter prediction unit 540 of the decoder 500 shown in FIG. 5 may implement decoding using machine learning prediction coding models 800.

Decoding using machine learning prediction coding models 800 may include identifying a current encoded block at 810, generating a decoded block by decoding the current encoded block at 820, and outputting the decoded block at 830.

The current encoded block may be identified at 810. Identifying the current encoded block may include identifying a current encoded frame and identifying the current encoded block from the current encoded frame. For example, the current encoded block may be a block, such as one of the blocks 610, 620, 630, 640, 650 shown in FIG. 6. For example, identifying the current encoded block at 810 may include receiving a compressed bitstream, such as the compressed bitstream 502 shown in FIG. 5, and reading the current encoded block, or a portion thereof, from the compressed bitstream.

A decoded block may be generated at 820 by decoding the current encoded block identified at 810. Decoding the current encoded block at 820 may include generating a prediction block for the current block corresponding to the current encoded block, which may include identifying a prediction model at 822, identifying reference values at 824, and generating prediction values at 826.

Identifying the prediction model at 822 may include identifying a machine learning prediction coding model, such as an artificial neural network prediction coding model, which may generate each prediction values from the prediction block based on available reference values. For example, identifying the prediction model at 822 may include reading, extracting, or decoding data, such as a prediction model identifier, indicating the prediction model for decoding the current encoded block, from the compressed bitstream received at 810, such as from a header for the current encoded block. In an example, identifying the prediction model at 822 may include identifying a set of non-linear functions, such as high dimensional non-linear functions, representing, or generated by, a respective machine learning prediction coding model.

Available reference values may be identified at 824. For example, the prediction model identified at 822 may be an intra-prediction model and identifying the available reference values at 824 may include identifying the prediction values based on available reference values that correspond to pixels spatially proximate to, such as adjacent to or neighboring, the current block from the current frame, such as values of previously predicted, encoded, decoded, and reconstructed pixels. In another example, the prediction model identified at 822 may be an inter-prediction model and identifying the available reference values at 824 may include identifying the prediction values based on available reference values, such as values of previously predicted, encoded, decoded, and reconstructed pixels, determined based on a reference fame other than the current frame. In another example, the prediction model identified at 822 may be a compound inter-inter-prediction model and identifying the available reference values at 824 may include generating the prediction values based on available reference values, such as values of previously predicted, encoded, decoded, and reconstructed pixels, determined based on multiple reference frames other than the current frame. In another example, the prediction model identified at 822 may be a compound inter-intra-prediction model and identifying the available reference values at 824 may include generating the prediction values, such as values of previously predicted, encoded, decoded, and reconstructed pixels, based on available reference values determined based on the current frame and based on a reference fame other than the current frame.

Prediction values may be generated at 826 based on the prediction model identified at 822 and the available reference values identified at 824. For example, generating prediction values at 826 based on the artificial neural network prediction coding model identified at 822 and the available reference values identified at 824 may include determining a prediction value for each pixel of the current block by inputting the available reference values identified at 824 to the artificial neural network prediction coding model identified at 822 and obtaining the output of the artificial neural network prediction coding models identified at 822 as the prediction values. Encoding, or decoding, using an artificial neural network prediction coding model may include instantiating or operating an instance of an artificial neural network described by the artificial neural network model.

Although not shown expressly in FIG. 8, generating a decoded block by decoding the current encoded block at 820 may include performing other elements of video decoding, such as entropy decoding by an entropy decoding unit, such as the entropy decoding unit 510 shown in FIG. 5, dequantization by a dequantization unit, such as the dequantization unit 520 shown in FIG. 5, inverse transformation by an inverse transform unit, such as the inverse transform unit 530 shown in FIG. 5, reconstruction by a reconstruction unit, such as the reconstruction unit 550 shown in FIG. 5, or any other aspect of video coding.

The decoded block may be output at 830. For example, the decoded block may be included in a decoded frame, which may be output, such as shown at 850 in FIG. 8.

Other implementations of decoding using machine learning prediction coding models 800 are available. In some implementations, additional elements of decoding using machine learning prediction coding models can be added, certain elements can be combined, and/or certain elements can be removed.

FIGS. 9-18 are diagrams of examples of ad-hoc intra-prediction models in accordance with implementations of this disclosure. Ad-hoc prediction models, such as the ad-hoc intra-prediction models shown in FIGS. 9-18, may be expressly, such as manually, generated or defined, and may differ from the machine learning prediction models, such as artificial neural network prediction models, described herein.

In FIGS. 9-18 a current block for intra-prediction is indicated using a thick black boarder; current pixels, or corresponding pixel locations, of the current block are indicated using a white background; and available referenced pixels, or corresponding pixel locations, that are available for intra-prediction of the current block are indicated using a stippled background. Although some pixel locations are shown as available reference pixels for intra-prediction of the current block in FIGS. 9-18, the pixel locations shown as available reference pixels may be unavailable for intra-prediction, and other pixel locations may be available or unavailable for intra-prediction of the current block, based, for example, on block size, adjacent block size, and block scan order. For example, the available reference pixels are shown in FIGS. 9-18 above the current block and to the left of the current block, which corresponds with predicting the current frame using a block raster scan order. In other examples (not shown), a reverse block raster scan order may be used, and the reference pixels available for intra-prediction of the current block may be below the current block and to the right of the current block.

For simplicity and clarity, rows of a current block may be indicated using respective row identifiers (i); columns of the current block may be indicated using respective column identifiers (j); a spatial location of a current pixel (P) in the current block may be may be indicated using coordinates, such as Cartesian coordinates, which may include a combination of a row (i) location and a column (j) location, and which may be expressed as $P_{i,j}$; and a spatial location of an available reference pixel (R) in the current frame may be may be indicated using coordinates, such as Cartesian coordinates, relative to the current block, which may include a combination of a relative row (i) location and a relative column (j) location, and which may be expressed as $R_{i,j}$.

For example, the top row of the current block may be expressed as i=0, the second from the top row of the current block may be expressed as i=1, the third from the top row of the current block may be expressed as i=2, the bottom row of the current block may be expressed as i=3, the left column of the current block may be expressed as j=0, the second from the left column of the current block may be expressed as j=1, the third from the left column of the current block may be expressed as j=2, the right column of the current block may be expressed as j=3, the pixel in the top left corner of the current block may be referred to as $P_{0,0}$, the pixel in the top right corner of the current block may be referred to as $P_{0,3}$, the pixel in the bottom left corner of the current block may be referred to as $P_{3,0}$, the pixel in the bottom right corner of the current block may be referred to as $P_{3,3}$, the available reference pixel in the row above the current block (i=−1) and in the left column (j=0) of the current block may be referred to as $R_{-1,0}$, the available reference pixel in the column to the left of the current block (j=−1) and in the top row (i=0) of the current block may be referred to as $R_{0,4}$, and the available reference pixel above and to the left of the current block may be referred to as $R_{-1,-1}$.

Although the current block shown in FIGS. 9-18 is a 4×4 block for simplicity, any size block may be used. For example, a 64×64 block, a 64×32 block, a 32×64 block, a 32×32 block, a 32×16 block, a 16×32 block, a 16×16 block, a 16×8 block, an 8×16 block, an 8×8 block, an 8×4 block, or a 4×8 block, may be used.

Figure 9:
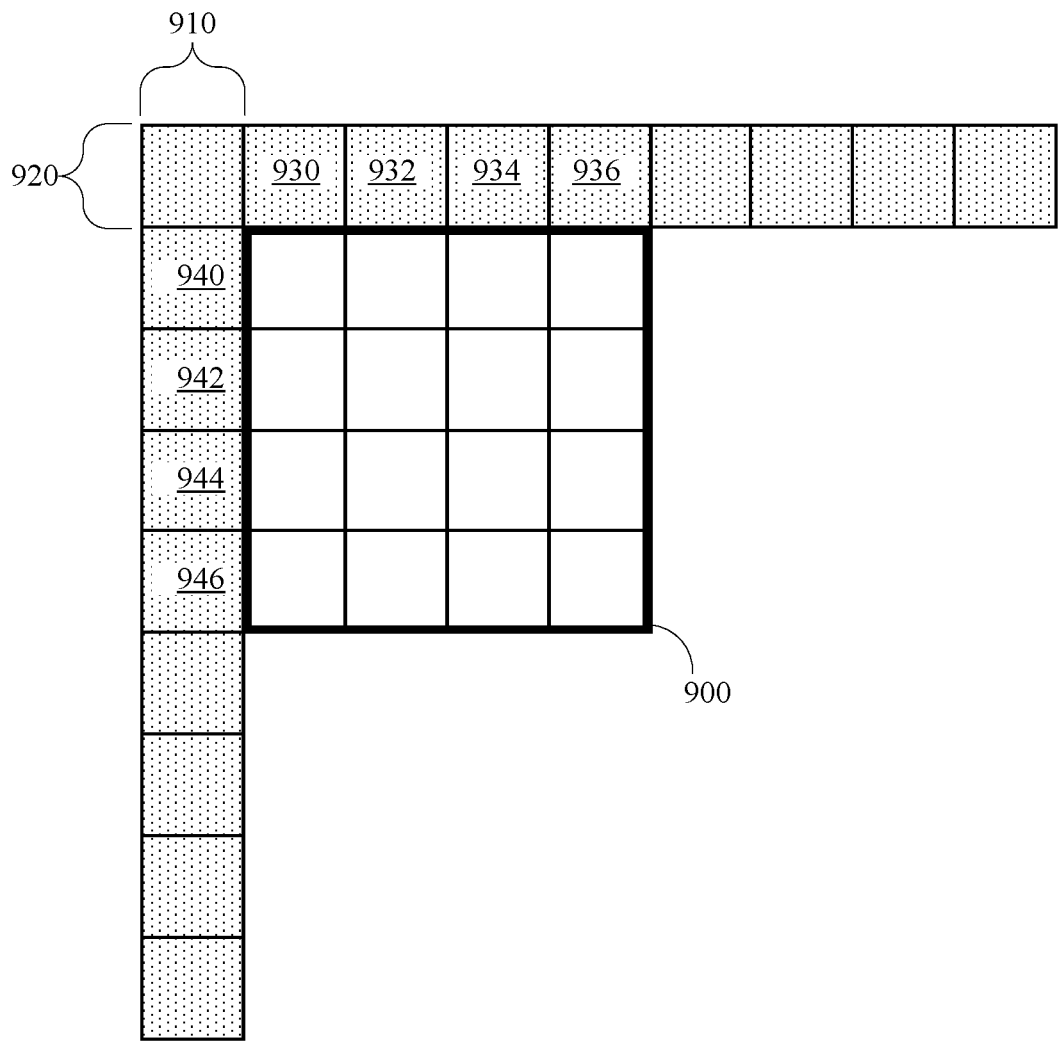
FIG. 9 is a diagram of an example of ad-hoc DC intra-prediction in accordance with implementations of this disclosure.

FIG. 9 is a diagram of an example of an ad-hoc DC intra-prediction model in accordance with implementations of this disclosure. The ad-hoc DC intra-prediction model may include generating a prediction block, or prediction pixels of a prediction block, for a current block 900 based on available reference pixel values proximate to, such as adjacent to or neighboring, the current block 900, such as available reference pixels from a column 910 immediately to the left of the current block 900, a row 920 immediately above the current block 900, or both.

For example, the ad-hoc DC intra-prediction model may include generating prediction pixel values each pixel of the current block 900 as a function, such as an average, of the available reference pixels 930, 932, 934, 936 immediately above the current block 900 and the available reference pixels 940, 942, 944, 946 immediately to the left of the current block 900.

Figure 10:
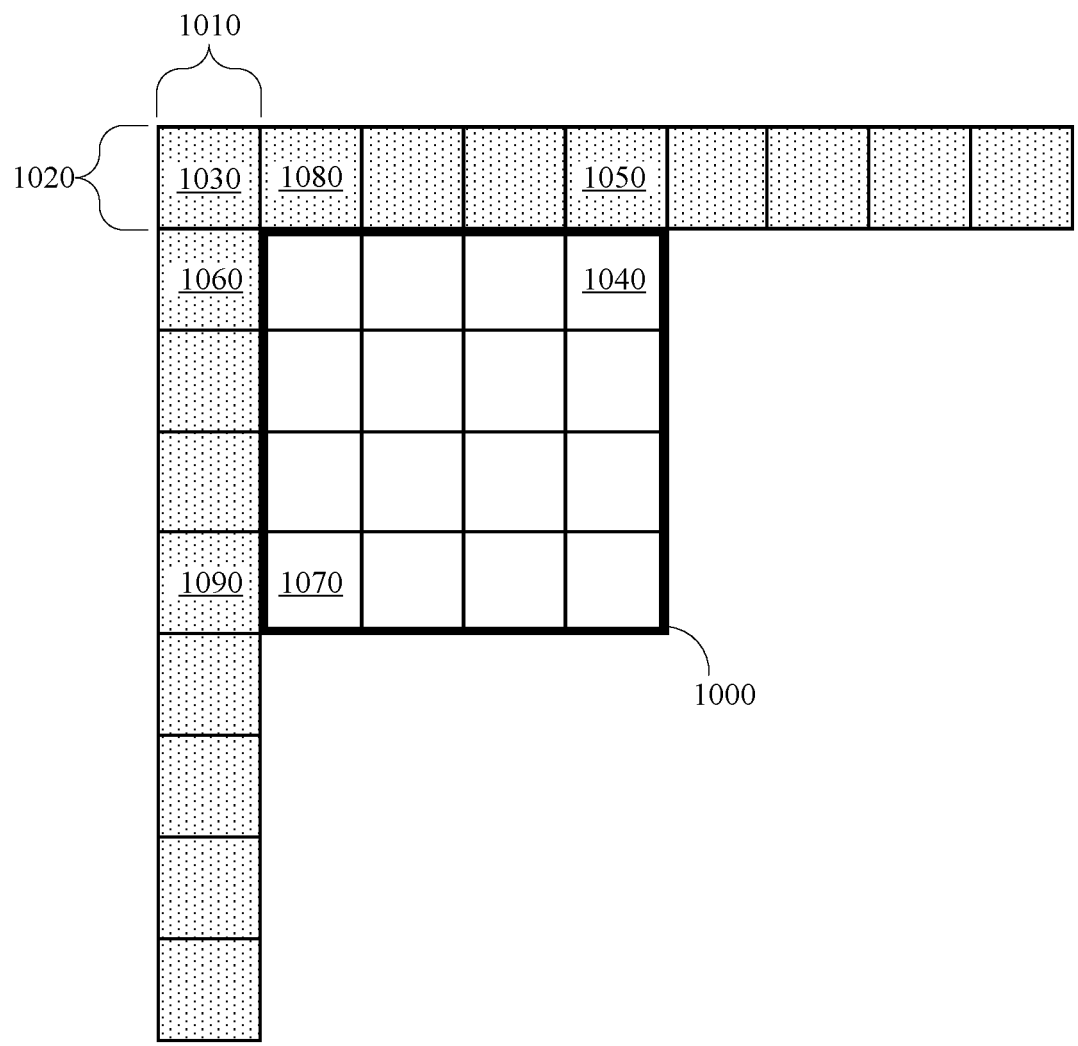
FIG. 10 is a diagram of an example of ad-hoc TrueMotion intra-prediction in accordance with implementations of this disclosure.

FIG. 10 is a diagram of an example of an ad-hoc TrueMotion (TM) intra-prediction model in accordance with implementations of this disclosure. The ad-hoc TrueMotion intra-prediction model may include generating a prediction block, or prediction pixels of a prediction block, for a current block 1000 based on available reference pixel values proximate to, such as adjacent to or neighboring, the current block 1000, such as available reference pixels from a column 1010 immediately to the left of the current block 1000, a row 1020 immediately above the current block 1000, or both.

The ad-hoc TrueMotion intra-prediction model may include generating a prediction pixel value for a current pixel ($P_{i,j}$) of the current block 1000 as a function of an available reference pixel ($R_{i,-1}$) to the left of the current block 1000 in the row (i) of the current pixel ($P_{i,j}$), an available reference pixel ($R_{-1,j}$) above the current block 1000 in the column (j) of the current pixel ($P_{i,j}$), and the available reference pixel 1030 above and to the left ($R_{-1,-1}$) of the current block 1000, which may include generating the prediction pixel value for a current pixel $P_{i,j}$ of the current block 1000 as a difference between a sum of the respective available reference pixel ($R_{i,-1}$) i) to the left of the current block 1000 in the row (i) of the current pixel ($P_{i,j}$) and the respective available reference pixel ($R_{-1,j}$) above the current block 1000 in the column (j) of the current pixel ($P_{i,j}$) and an available reference pixel 1030 above and to the left ($R_{-1,-1}$) of the current block 1000, which may be expressed as $P_{i,j}=(R_{i,-1}+R_{-1,j})-R_{-1,-1}$.

For example, the ad-hoc TrueMotion intra-prediction model may include generating a prediction pixel value for the pixel 1040 in the top right corner ($P_{0,3}$) of the current block 1000 by determining a result subtracting the value of the available reference pixel 1030 above and to the left ($R_{-1,-1}$) of the current block 1000 from a sum of the available reference pixel 1050 in the row above (i=−1) the current block 1000 and in the column of the current pixel 1040 (j=3) and the available reference pixel 1060 in the column to the left (j=−1) of the current block 1000 and in the row of the current pixel 1040 (i=0), which may be expressed as $P_{0,3}=(R_{-1,3}+R_{0,-1})-R_{-1,-1}$.

In another example, the ad-hoc TrueMotion intra-prediction model may include generating a prediction pixel value for the pixel 1070 in the bottom left corner ($P_{3,0}$) of the current block 1000 by determining a result subtracting the value of the available reference pixel 1030 above and to the left ($R_{-1,-1}$) of the current block 1000 from a sum of the available reference pixel 1080 in the row above (i=−1) the current block 1000 and in the column of the current pixel 1070 (j=0) and the available reference pixel 1070 in the column to the left (j=−1) of the current block 1000 and in the row of the current pixel 1070 (i=3), which may be expressed as $P_{3,0}=(R_{-1,0}+R_{3,-1})-R_{-1,-1}$.

Figure 11:
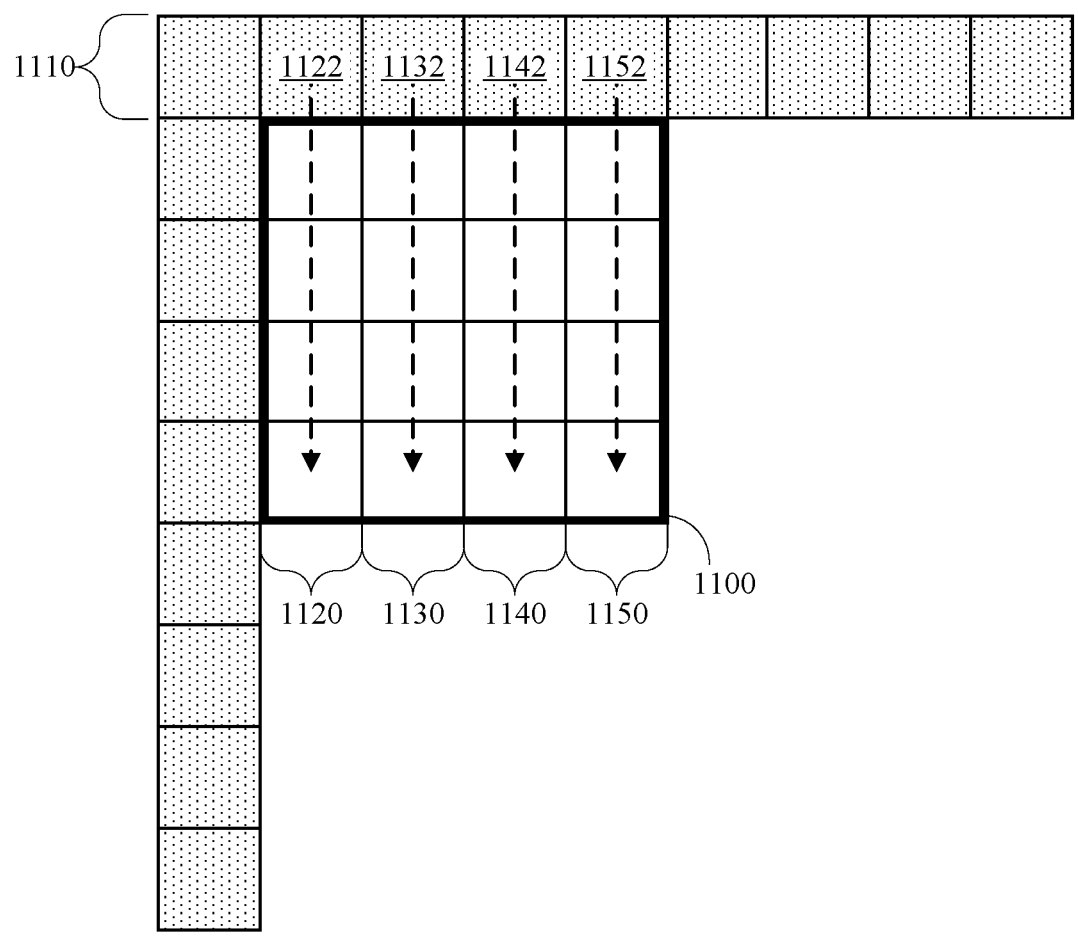
FIG. 11 is a diagram of an example of ad-hoc vertical intra-prediction in accordance with implementations of this disclosure.

FIG. 11 is a diagram of an example of an ad-hoc vertical intra-prediction model in accordance with implementations of this disclosure. The ad-hoc vertical intra-prediction model may include generating a prediction block, or prediction pixels of a prediction block, for a current block 1100 based on available reference pixel values vertically proximate to, such as adjacent to or neighboring, the current block 1100, such as available reference pixels from a row 1110 immediately above the current block 1100. For example, the ad-hoc vertical intra-prediction model may include generating prediction pixel values for the pixels in a respective column of a current block 1100 by copying the value of an available reference pixel above the current block in the corresponding column, as indicated by the broken lines pointing vertically down through the current block 1100.

In an example, predicted values for the pixels in the left column 1120 of the current block 1100 may be generated using the ad-hoc vertical intra-prediction model based on, such as by copying, the value of the available reference pixel 1122 in the row immediately above the current block 1100 and in the corresponding column. Predicted values for the pixels in the second from the left column 1130 of the current block 1100 may be generated using the ad-hoc vertical intra-prediction model based on, such as by copying, the value of the available reference pixel 1132 in the row immediately above the current block 1100 and in the corresponding column. Predicted values for the pixels in the second from the right column 1140 of the current block 1100 may be generated using the ad-hoc vertical intra-prediction model based on, such as by copying, the value of the available reference pixel 1142 in the row immediately above the current block 1100 and in the corresponding column. Predicted values for the pixels in the right column 1150 of the current block 1100 may be generated using the ad-hoc vertical intra-prediction model based on, such as by copying, the value of the available reference pixel 1152 in the row immediately above the current block 1100 and in the corresponding column.

Figure 12:
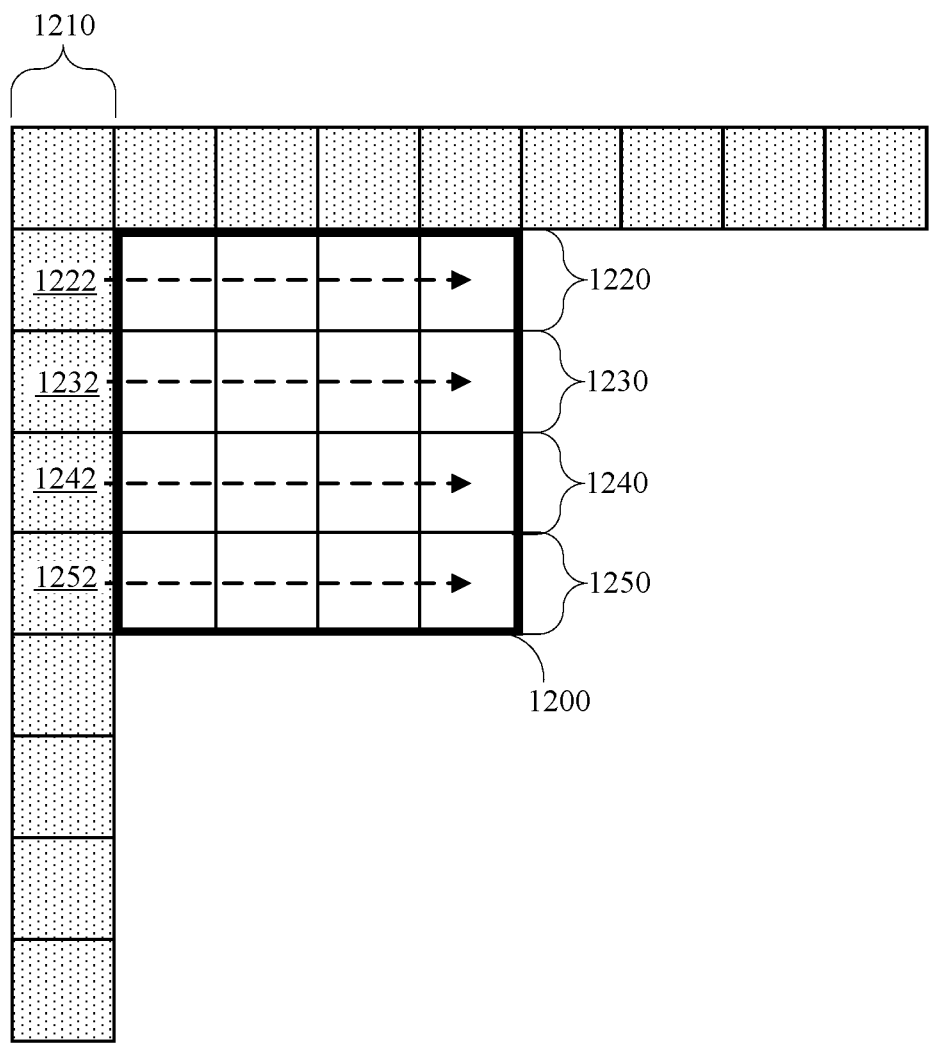
FIG. 12 is a diagram of an example of ad-hoc horizontal intra-prediction in accordance with implementations of this disclosure.

FIG. 12 is a diagram of an example of an ad-hoc horizontal intra-prediction model in accordance with implementations of this disclosure. The ad-hoc horizontal intra-prediction model may include generating a prediction block, or prediction pixels of a prediction block, for a current block 1200 based on available reference pixel values horizontally proximate to, such as adjacent to or neighboring, the current block 1200, such as available reference pixels from a column 1210 immediately to the left of the current block 1200. For example, the ad-hoc horizontal intra-prediction model may include generating prediction pixel values for the pixels in a respective row of a current block 1200 by copying the value of an available reference pixel to the left of the current block in the corresponding row, as indicated by the broken lines pointing horizontally across through the current block 1200.

In an example, predicted values for the pixels in the top row 1220 of the current block 1200 may be generated using the ad-hoc horizontal intra-prediction model based on, such as by copying, the value of the available reference pixel 1222 in the column immediately to the left of the current block 1200 and in the corresponding row. Predicted values for the pixels in the second from the top row 1230 of the current block 1200 may be generated using the ad-hoc horizontal intra-prediction model based on, such as by copying, the value of the available reference pixel 1232 in the column immediately to the left of the current block 1200 and in the corresponding row. Predicted values for the pixels in the second from the bottom row 1240 of the current block 1200 may be generated using the ad-hoc horizontal intra-prediction model based on, such as by copying, the value of the available reference pixel 1242 in the column immediately to the left of the current block 1200 and in the corresponding row. Predicted values for the pixels in the bottom row 1250 of the current block 1200 may be generated using the ad-hoc horizontal intra-prediction model based on, such as by copying, the value of the available reference pixel 1252 in the column immediately to the left of the current block 1200 and in the corresponding row.

Figure 13:
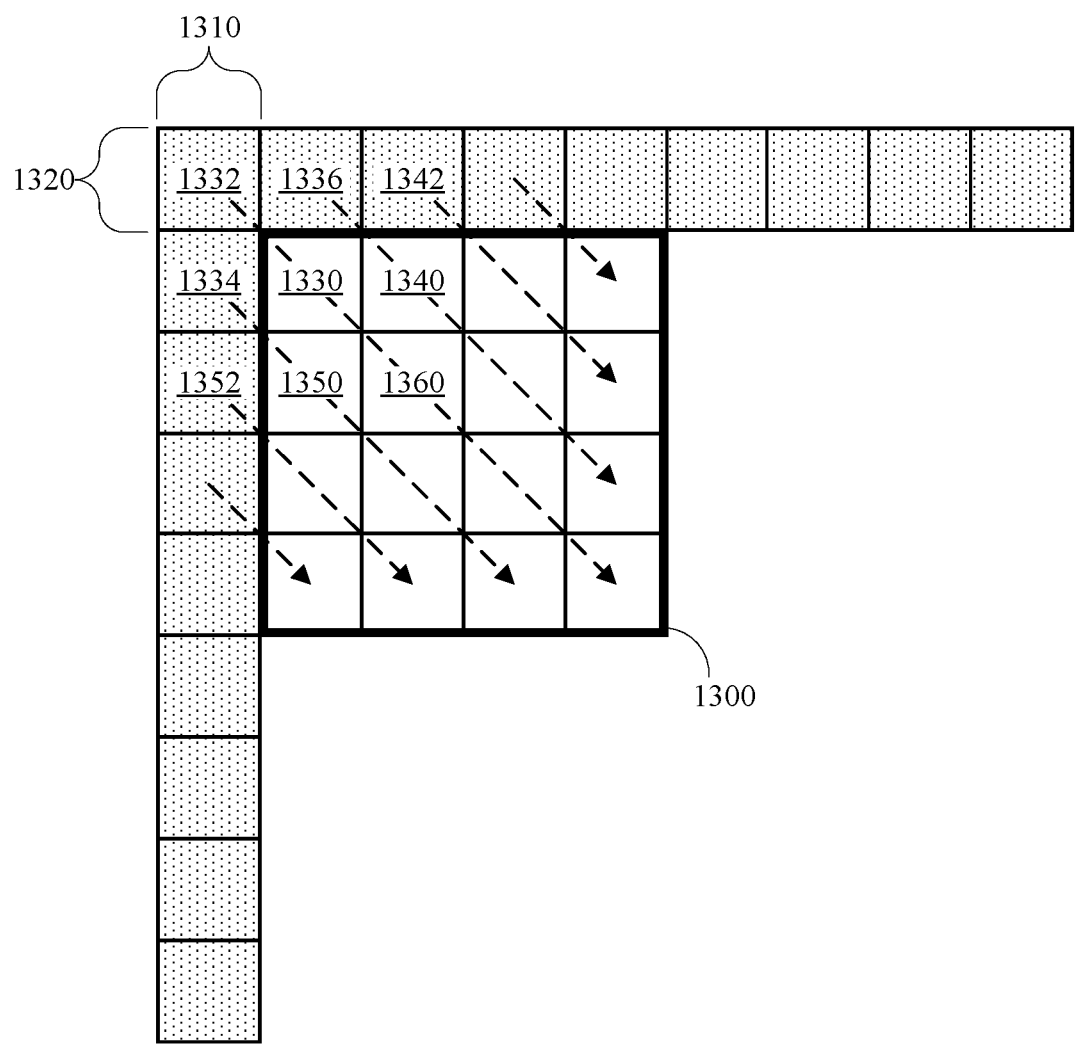
FIG. 13 is a diagram of an example of ad-hoc diagonal down-right intra-prediction in accordance with implementations of this disclosure.

FIG. 13 is a diagram of an example of an ad-hoc diagonal down-right, or 135°, intra-prediction model in accordance with implementations of this disclosure. The ad-hoc diagonal down-right intra-prediction model may include generating a prediction block, or prediction pixels of a prediction block, for a current block 1300 based on available reference pixel values diagonally, such as at an angle of 135° counter-clockwise from right as 0°, proximate to, such as adjacent to or neighboring, the current block 1300, such as available reference pixels from a column 1310 immediately to the left of the current block 1300, available reference pixels from a row 1320 immediately above the current block 1300, or a combination thereof.

The ad-hoc diagonal down-right intra-prediction model may include generating prediction pixel values for respective pixels of a current block 1300 based on available reference pixels diagonally above and to the left of the respective pixel location in the current block along, or proximate to, the corresponding diagonal, as indicated by the broken lines pointing diagonally down and right at an angle of 135° counter-clockwise from right as 0° through the current block 1300.

For example, a predicted value for the pixel 1330 at the top left corner of the current block 1300 may be generated using the ad-hoc diagonal down-right intra-prediction model, such as using a 3-tap interpolation filter centered on the available reference pixel 1332 along the 135° angle, which may include using the respective values of the available reference pixel 1332 along the 135° angle and the available reference pixels 1334, 1336 adjacent to the available reference pixel 1332 along the 135° angle, such as by using a sum of one fourth of the value of the available reference pixel 1334 adjacent below the available reference pixel 1332 along the 135° angle, one fourth of the value of the available reference pixel 1336 adjacent to the right of the available reference pixel 1332 along the 135° angle, and one half the value of the available reference pixel 1332 along the 135° angle.

A predicted value for the pixel 1340 in the top row and the second from the left column of the current block 1300 may be generated using the ad-hoc diagonal down-right intra-prediction model, such as using a 3-tap interpolation filter centered on the available reference pixel 1336 along the 135° angle, which may include using the value of the available reference pixel 1336 along the 135° angle and the respective values of the available reference pixels 1332, 1342 adjacent to the available reference pixel 1336 along the 135° angle, such as by using a sum of one fourth of the value of the available reference pixel 1332 adjacent to the left of the available reference pixel 1336 along the 135° angle, one fourth of the value of the available reference pixel 1342 adjacent to the right of the available reference pixel 1336 along the 135° angle, and one half the value of the available reference pixel 1336 along the 135° angle. Predicted values for the other pixels in the top row of the current block 1300 may be similarly predicted using a 3-tap interpolation filter centered on the respective available reference pixel along the respective 135° angle.

A predicted value for the pixel 1350 in the second from the top row and the left column of the current block 1300 may be generated using the ad-hoc diagonal down-right intra-prediction model, such as using a 3-tap interpolation filter centered on the available reference pixel 1334 along the 135° angle, which may include using the value of the available reference pixel 1334 along the 135° angle and the respective values of the available reference pixels 1332, 1352 adjacent to the available reference pixel 1334 along the 135° angle, such as by using a sum of one fourth of the value of the available reference pixel 1332 adjacent above the available reference pixel 1334 along the 135° angle, one fourth of the value of the available reference pixel 1352 adjacent below the available reference pixel 1334 along the 135° angle, and one half the value of the available reference pixel 1334 along the 135° angle. Predicted values for the other pixels in the left column of the current block 1300 may be similarly predicted using a 3-tap interpolation filter centered on the respective available reference pixel along the respective 135° angle.

A predicted value for the pixel 1360 in the second from the top row and the second from the left column of the current block 1300 may be generated using the ad-hoc diagonal down-right intra-prediction model, such as by using the value of the immediately adjacent prediction pixel 1330 along the 135° angle. Predicted values for the other pixels in the current block 1300 may be similarly predicted using the value of the immediately adjacent prediction pixel along the 135° angle.

Figure 14:
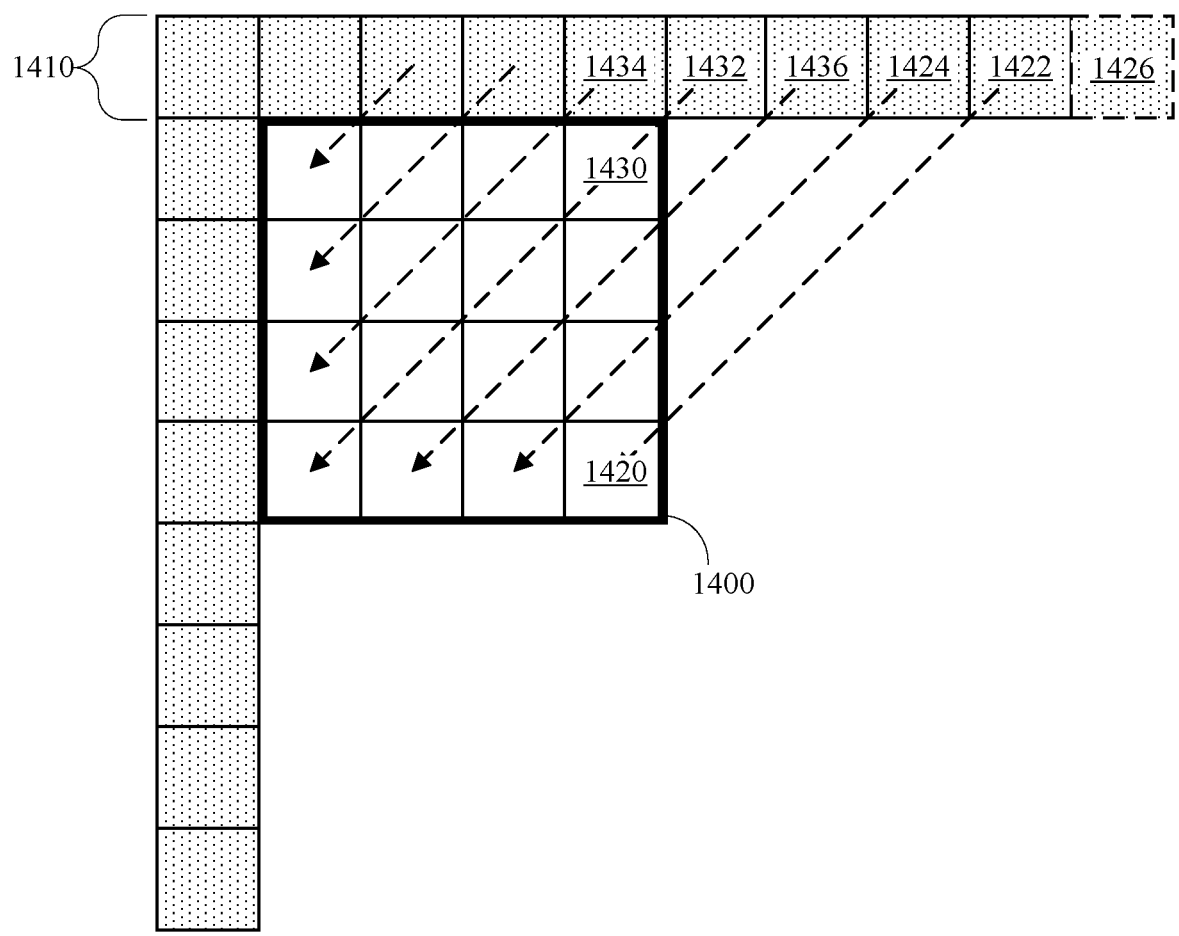
FIG. 14 is a diagram of an example of ad-hoc diagonal down-left intra-prediction in accordance with implementations of this disclosure.

FIG. 14 is a diagram of an example of an ad-hoc diagonal down-left, or 45°, intra-prediction model in accordance with implementations of this disclosure. The ad-hoc diagonal down-left intra-prediction model may include generating a prediction block, or prediction pixels of a prediction block, for a current block 1400 based on available reference pixel values diagonally, such as at an angle of 45° counter-clockwise from right as 0°, proximate to, such as adjacent to or neighboring, the current block 1400, such as available reference pixels from a row 1410 immediately above the current block 1400.

The ad-hoc diagonal down-left intra-prediction model may include generating prediction pixel values for respective pixels of a current block 1400 based on available reference pixels diagonally above and to the right of the respective pixel location in the current block 1400 along, or proximate to, the corresponding diagonal, as indicated by the broken lines pointing diagonally down and left at an angle of 45° counter-clockwise from right as 0° through the current block 1400.

For example, a predicted value for the pixel 1420 at the bottom right corner of the current block 1400 may be generated using the ad-hoc diagonal down-left intra-prediction model, such as using a 3-tap interpolation filter centered on the available reference pixel 1422 along the 45° angle, which may include using the value of the available reference pixel 1422 along the 45° angle and the respective values of the available reference pixels 1424, 1426 adjacent to the available reference pixel 1422 along the 45° angle, such as by using a sum of one fourth of the value of the available reference pixel 1424 adjacent to the left of the available reference pixel 1422 along the 45° angle, one fourth of the value of the available reference pixel 1426 adjacent to the right of the available reference pixel 1422 along the 45° angle, and one half the value of the available reference pixel 1422 along the 45° angle. The available reference pixel 1426 adjacent to the right of the available reference pixel 1422 along the 45° angle is shown using a broken line boarder to indicate that a spatially corresponding reference pixel may be unavailable and the value of the available reference pixel 1422 along the 45° angle may be used as the value of the reference pixel 1426 adjacent to the right of the available reference pixel 1422 along the 45° angle.

A predicted value for the pixel 1430 in the top right corner of the current block 1400 may be generated using the ad-hoc diagonal down-left intra-prediction model, such as using a 3-tap interpolation filter centered on the available reference pixel 1432 along the 45° angle, which may include using the value of the available reference pixel 1432 along the 45° angle and the respective values of the available reference pixels 1434, 1436 adjacent to the available reference pixel 1432 along the 45° angle, such as by using a sum of one fourth of the value of the available reference pixel 1434 adjacent to the left of the available reference pixel 1432 along the 45° angle, one fourth of the value of the available reference pixel 1436 adjacent to the right of the available reference pixel 1432 along the 45° angle, and one half the value of the available reference pixel 1432 along the 45° angle. Predicted values for the other pixels in the current block 1400 may be similarly predicted using a 3-tap interpolation filter centered on the respective available reference pixel along the respective 45° angle.

Figure 15:
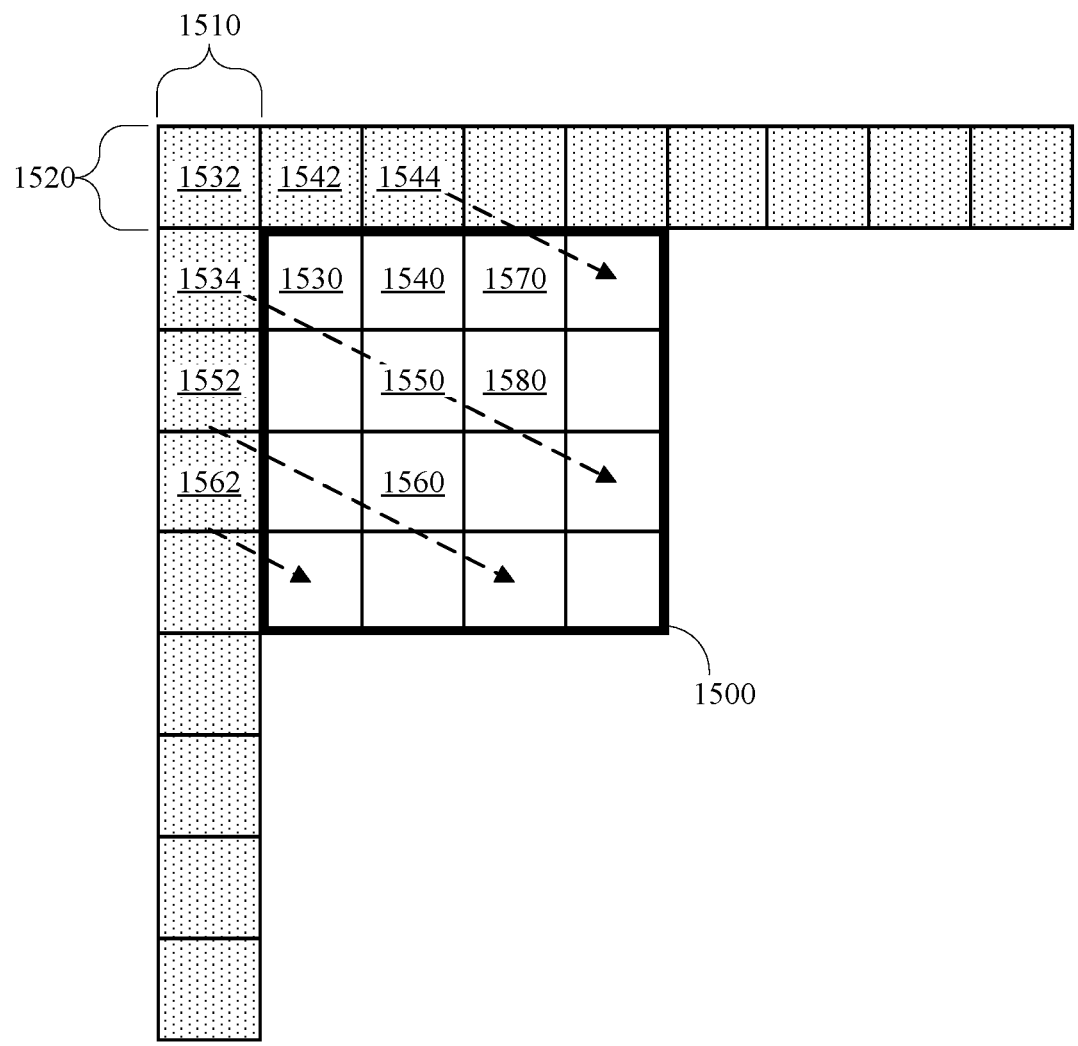
FIG. 15 is a diagram of an example of ad-hoc horizontal-down-right intra-prediction in accordance with implementations of this disclosure.

FIG. 15 is a diagram of an example of an ad-hoc horizontal-down-right, or 153°, intra-prediction model in accordance with implementations of this disclosure. Horizontal-down-right intra-prediction may include generating a prediction block, or prediction pixels of a prediction block, for a current block 1500 based on available reference pixel values diagonally, such as at an angle of 153° counter-clockwise from right as 0°, proximate to, such as adjacent to or neighboring, the current block 1500, such as available reference pixels from a column 1510 immediately to the left of the current block 1500, available reference pixels from a row 1520 immediately above the current block 1500, or a combination thereof.

Horizontal-down-right intra-prediction may include generating prediction pixel values for respective pixels of a current block 1500 based on available reference pixels diagonally above and to the left of the current block 1500 along, or proximate to, the corresponding diagonal, as indicated by the broken lines pointing diagonally down and right at an angle of 153° counter-clockwise from right as 0° through the current block 1500.

For example, a predicted value for the pixel 1530 at the top left corner of the current block 1500 may be generated using horizontal-down-right intra-prediction, such as using a 2-tap interpolation filter centered along the 153° angle, which may be between the available reference pixels 1532, 1534 proximate to the 153° angle, and which may include using the respective values of the available reference pixels 1532, 1534 proximate to the 153° angle. Predicted values for the other pixels in the left column of the current block 1500 may be similarly predicted using a 2-tap interpolation filter centered along the respective 153° angle, which may include using the respective two available reference pixels proximate to the 153° angle.

A predicted value for the pixel 1540 in the top row and the second from the left column the current block 1500 may be generated using horizontal-down-right intra-prediction, such as using a 3-tap interpolation filter centered on the available reference pixel 1532 along, or most proximate to, the 153° angle, which may include using the value of the available reference pixel 1532 along, or most proximate to, the 153° angle and the respective values of the available reference pixels 1534, 1542 adjacent to the available reference pixel 1532 along, or most proximate to, the 153° angle. A predicted value for the pixel 1550 in the second row from the top and the second column from the left of the current block 1500 may be generated using horizontal-down-right intra-prediction, such as using a 3-tap interpolation filter centered on the available reference pixel 1534 along, or most proximate to, the 153° angle, which may include using the value of the available reference pixel 1534 along, or most proximate to, the 153° angle and the respective values of the available reference pixels 1532, 1552 adjacent to the available reference pixel 1534 along, or most proximate to, the 153° angle. A predicted value for the pixel 1560 in the third row from the top and the second column from the left of the current block 1500 may be generated using horizontal-down-right intra-prediction, such as using a 3-tap interpolation filter centered on the available reference pixel 1552 along, or most proximate to, the 153° angle, which may include using the value of the available reference pixel 1552 along, or most proximate to, the 153° angle and the respective values of the available reference pixels 1534, 1562 adjacent to the available reference pixel 1552 along, or most proximate to, the 153° angle. Predicted values for the other pixels in the second column from the left of the current block 1500 may be similarly predicted using a 3-tap interpolation filter centered on the respective available reference pixel along the respective 153° angle.

A predicted value for the pixel 1570 in the top row and the third column from the left of the current block 1500 may be generated using horizontal-down-right intra-prediction, such as using a 3-tap interpolation filter centered on the available reference pixel 1542 along, or most proximate to, the 153° angle, which may include using the value of the available reference pixel 1542 along, or most proximate to, the 153° angle and the respective values of the available reference pixels 1532, 1544 adjacent to the available reference pixel 1542 along, or most proximate to, the 153° angle. Predicted values for the other pixels in the top row of the current block

1500 may be similarly predicted using a 3-tap interpolation filter centered on the respective available reference pixel along the respective 153° angle.

A predicted value for the pixel 1580 in the second from the top row and the third from the left column of the current block 1500 may be generated using horizontal-down-right intra-prediction, such as by using the value of the prediction pixel 1530 along, or most proximate to, the 153° angle, such as the prediction pixel 1530 in the row above the pixel 1580 in the second from the top row and the third from the left column of the current block 1500 and in the column two columns to the left of the pixel 1580 in the second from the top row and the third from the left column of the current block 1500. Predicted values for the other pixels in the current block 1500 may be similarly predicted using the value of the prediction pixel along, or most proximate to, the 153° angle, such as the prediction pixel in the row above the respective current pixel and in the column two columns to the left of the respective current pixel.

Figure 16:
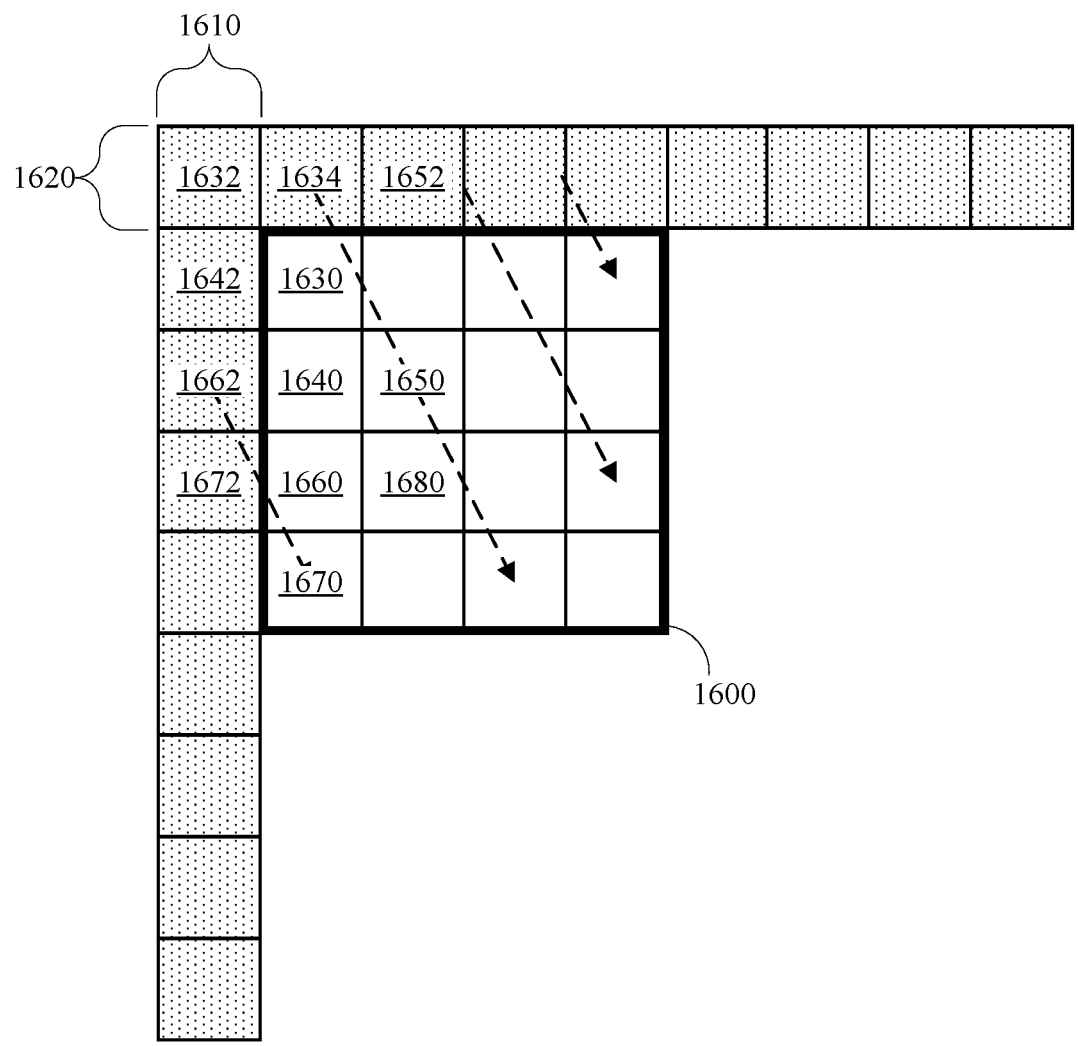
FIG. 16 is a diagram of an example of ad-hoc vertical-down-right intra-prediction in accordance with implementations of this disclosure.

FIG. 16 is a diagram of an example of an ad-hoc vertical-down-right, or 117°, intra-prediction model in accordance with implementations of this disclosure. Vertical-down-right intra-prediction may include generating a prediction block, or prediction pixels of a prediction block, for a current block 1600 based on available reference pixel values diagonally, such as at an angle of 117° counter-clockwise from right as 0°, proximate to, such as adjacent to or neighboring, the current block 1600, such as available reference pixels from a column 1610 immediately to the left of the current block 1600, available reference pixels from a row 1620 immediately above the current block 1600, or a combination thereof.

Vertical-down-right intra-prediction may include generating prediction pixel values for respective pixels of a current block 1600 based on available reference pixels diagonally above and to the left of the current block 1600 along, or proximate to, the corresponding diagonal, as indicated by the broken lines pointing diagonally down and right at an angle of 117° counter-clockwise from right as 0° through the current block 1600.

For example, a predicted value for the pixel 1630 at the top left corner of the current block 1600 may be generated using vertical-down-right intra-prediction, such as using a 2-tap interpolation filter centered along the 117° angle, which may be between the available reference pixels 1632, 1634 proximate to the 117° angle, and which may include using the respective values of the available reference pixels 1632, 1634 proximate to the 117° angle. Predicted values for the other pixels in the top row of the current block 1600 may be similarly predicted using a 2-tap interpolation filter centered along the respective 117° angle, which may include using the respective two available reference pixels proximate to the corresponding 117° angle.

A predicted value for the pixel 1640 in the second row from the top and the left column of the current block 1600 may be generated using vertical-down-right intra-prediction, such as using a 3-tap interpolation filter centered on the available reference pixel 1632 along, or most proximate to, the 117° angle, which may include using the value of the available reference pixel 1632 along, or most proximate to, the 117° angle and the respective values of the available reference pixels 1634, 1642 adjacent to the available reference pixel 1632 along, or most proximate to, the 117° angle. A predicted value for the pixel 1650 in the second row from the top and the second column from the left of the current block 1600 may be generated using vertical-down-right intra-prediction, such as using a 3-tap interpolation filter centered on the available reference pixel 1634 along, or most proximate to, the 117° angle, which may include using the value of the available reference pixel 1632 along, or most proximate to, the 117° angle and the respective values of the available reference pixels 1632, 1652 adjacent to the available reference pixel 1634 along, or most proximate to, the 117° angle. Predicted values for the other pixels in the second row from the top of the current block 1600 may be similarly predicted using a 3-tap interpolation filter centered on the respective available reference pixel along, or most proximate to, the respective 117° angle.

A predicted value for the pixel 1660 in the third row from the top and the left column of the current block 1600 may be generated using vertical-down-right intra-prediction, such as using a 3-tap interpolation filter centered on the available reference pixel 1642 along, or most proximate to, the 117° angle, which may include using the value of the available reference pixel 1642 along, or most proximate to, the 117° angle and the respective values of the available reference pixels 1632, 1662 adjacent to the available reference pixel 1642 along, or most proximate to, the 117° angle.

A predicted value for the pixel 1670 in the fourth row from the top and the left column of the current block 1600 may be generated using vertical-down-right intra-prediction, such as using a 3-tap interpolation filter centered on the available reference pixel 1662 along, or most proximate to, the 117° angle, which may include using the value of the available reference pixel 1662 along, or most proximate to, the 117° angle and the respective values of the available reference pixels 1642, 1672 adjacent to the available reference pixel 1662 along, or most proximate to, the 117° angle. Predicted values for the other pixels in the left column of the current block 1600 may be similarly predicted using a 3-tap interpolation filter centered on the respective available reference pixel along, or most proximate to, the respective 117° angle.

A predicted value for the pixel 1680 in the third from the top row and the second from the left column of the current block 1600 may be generated using vertical-down-right intra-prediction, such as by using the value of the prediction pixel 1630 along, or most proximate to, the 117° angle, such as the prediction pixel 1630 in the row two rows above the pixel 1680 in the third from the top row and the second from the left column of the current block 1600 and in the column to the left of the pixel 1680 in the third from the top row and the second from the left column of the current block 1600. Predicted values for the other pixels in the current block 1600 may be similarly predicted using the value of the prediction pixel along, or most proximate to, the 117° angle, such as the prediction pixel in the row two rows above the respective current pixel and in the column to the left of the respective current pixel.

Figure 17:
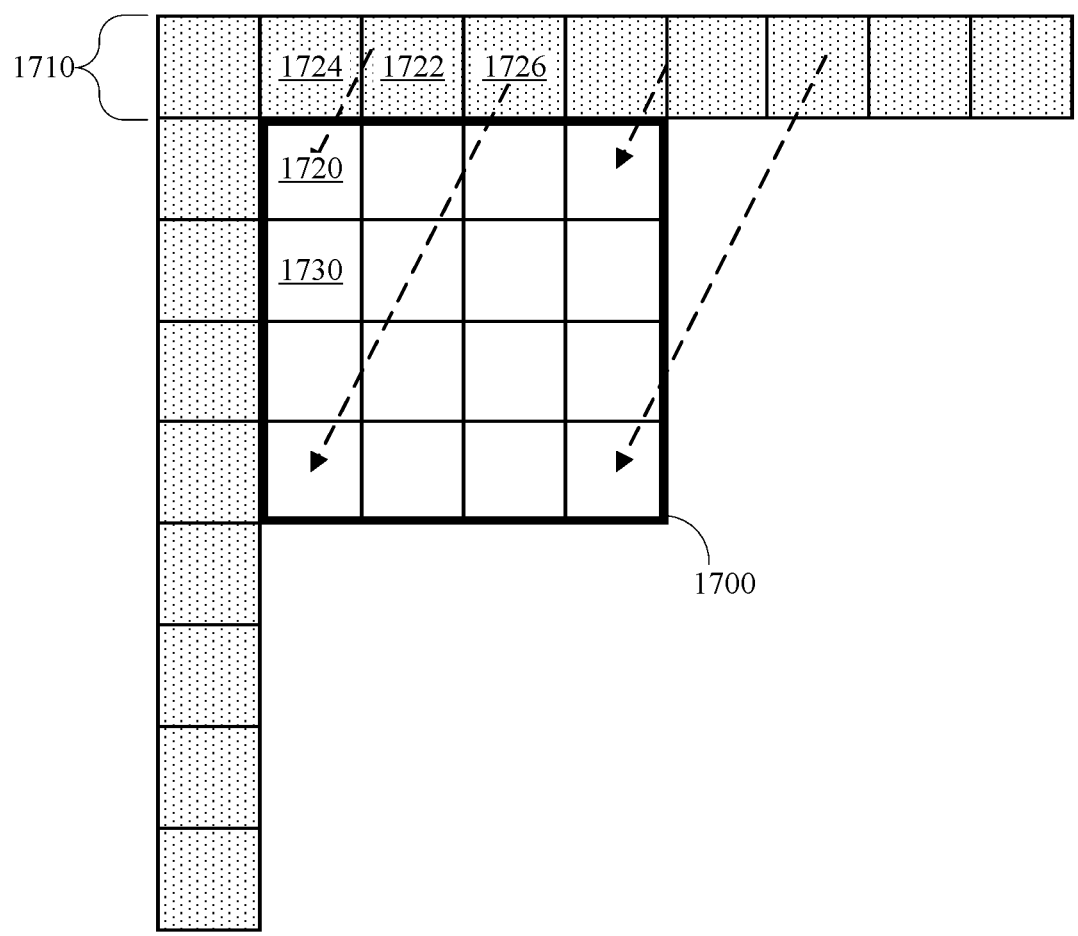
FIG. 17 is a diagram of an example of ad-hoc vertical-down-left intra-prediction in accordance with implementations of this disclosure.

FIG. 17 is a diagram of an example of an ad-hoc vertical-down-left, or 63°, intra-prediction model in accordance with implementations of this disclosure. Vertical-down-left intra-prediction may include generating a prediction block, or prediction pixels of a prediction block, for a current block 1700 based on available reference pixel values diagonally, such as at an angle of 63° counter-clockwise from right as 0°, proximate to, such as adjacent to or neighboring, the current block 1700, such as available reference pixels from a row 1710 immediately above the current block 1700, or a combination thereof.

Vertical-down-left intra-prediction may include generating prediction pixel values for respective pixels of a current block 1700 based on available reference pixels diagonally above and to the right of the current block 1700 along, or proximate to, the corresponding diagonal, as indicated by the broken lines pointing diagonally down and left at an angle of 63° counter-clockwise from right as 0° through the current block 1700.

For example, a predicted value for the pixel 1720 at the top left corner of the current block 1700 may be generated using vertical-down-left intra-prediction, such as using a 3-tap interpolation filter centered on the available reference pixel 1722 along, or most proximate to, the 63° angle, which may include using the value of the available reference pixel 1722 along, or most proximate to, the 63° angle and the respective values of the available reference pixels 1724, 1726 adjacent to the available reference pixel 1732 along the 63° angle. Predicted values for the other pixels in the top row of the current block 1700 may be similarly predicted using a 3-tap interpolation filter centered on the available reference pixel along, or most proximate to, the 63° angle, which may include using the value of the available reference pixel along, or most proximate to, the 63° angle and the respective values of the available reference pixels adjacent to the available reference pixel along, or most proximate to, the 63° angle.

A predicted value for the pixel 1730 in the second from the top row and the left column of the current block 1700 may be generated using vertical-down-left intra-prediction, such as using a 2-tap interpolation filter centered along the 63° angle, which may be between the available reference pixels 1722, 1724 proximate to the 63° angle, and which may include using the respective values of the available reference pixels 1722, 1724 proximate to the 63° angle. Predicted values for the other pixels in the second from the top row of the current block 1700 may be similarly predicted using the 2-tap interpolation filter centered along the respective 63° angle, which may include using the respective two available reference pixels proximate to the 63° angle.

Predicted values for the other pixels immediately below pixels predicted using a 4-tap interpolation filter may be similarly predicted using the 2-tap interpolation filter centered along the respective 63° angle, which may include using the respective two available reference pixels proximate to the 63° angle. Predicted values for the other pixels immediately below pixels predicted using a 2-tap interpolation filter may be similarly predicted using the 3-tap interpolation filter centered on the available reference pixel along, or most proximate to, the 63° angle, which may include using the value of the available reference pixel along, or most proximate to, the 63° angle and the respective values of the available reference pixels adjacent to the available reference pixel along, or most proximate to, the 63° angle.

Figure 18:
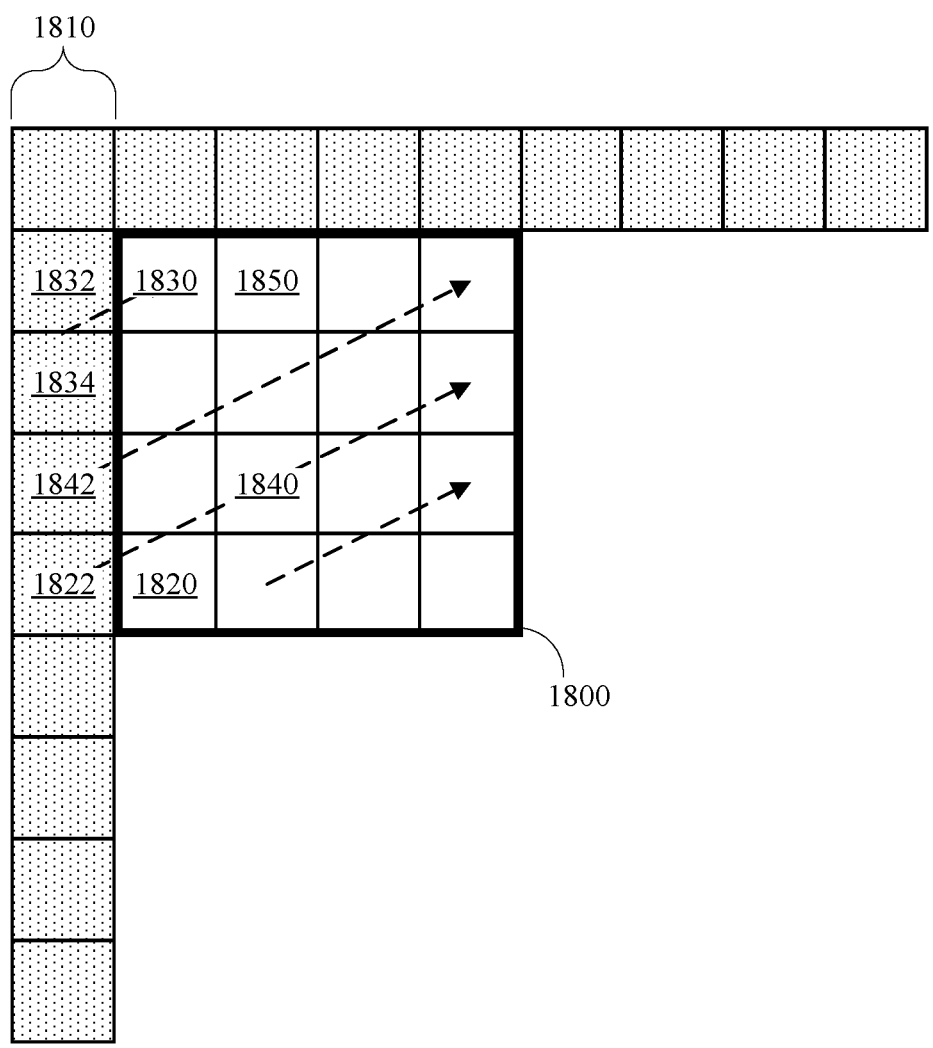
FIG. 18 is a diagram of an example of ad-hoc horizontal-up-right intra-prediction in accordance with implementations of this disclosure.

FIG. 18 is a diagram of an example of an ad-hoc horizontal-up-right, or 207°, intra-prediction model in accordance with implementations of this disclosure. Horizontal-up-right intra-prediction may include generating a prediction block, or prediction pixels of a prediction block, for a current block 1800 based on available reference pixel values diagonally, such as at an angle of 207° counter-clockwise from right as 0°, proximate to, such as adjacent to or neighboring, the current block 1800, such as available reference pixels from a column 1810 immediately to the left of the current block 1800, or a combination thereof.

For example, horizontal-up-right intra-prediction may include generating prediction pixel values for respective pixels of a current block 1800 based on available reference pixels diagonally below and to the left of the current block 1800 along, or proximate to, the corresponding diagonal, as indicated by the broken lines pointing diagonally up and right at an angle of 207° counter-clockwise from right as 0° through the current block 1800.

For example, a predicted value for the pixel 1820 at the bottom left corner of the current block 1800 may be generated using horizontal-up-right intra-prediction based on, such as by copying, the value of the available reference pixel 1822 in the column immediately to the left of the current block 1800 and in the corresponding row. In some implementations, reference pixels below the available reference pixel 1822 in the column immediately to the left of the current block 1800 and in the corresponding row may be unavailable. Predicted values for the other pixels in the bottom row of the current block 1800 may be similarly predicted, such as by copying the available reference pixel 1822 in the column immediately to the left of the current block 1800 and in the corresponding row.

A predicted value for the pixel 1830 at the top left corner of the current block 1800 may be generated using horizontal-up-right intra-prediction, such as using a 2-tap interpolation filter centered along the 207° angle, which may be between the available reference pixels 1832, 1834 proximate to the 207° angle, and which may include using the respective values of the available reference pixels 1832, 1834 proximate to the 207° angle. Predicted values for the other pixels in the left column of the current block 1800 may be similarly predicted using a 2-tap interpolation filter centered along the respective 207° angle, which may include using the respective two available reference pixels proximate to the 207° angle. A predicted value for the pixel 1840 in the second row from the bottom and the second column from the left of the current block 1800 may be generated using horizontal-up-right intra-prediction, such as using a 3-tap interpolation filter centered on the available reference pixel 1822 along, or most proximate to, the 207° angle, which may include using the value of the available reference pixel 1822 along, or most proximate to, the 207° angle and the respective values of the available reference pixel 1842 adjacent to the available reference pixel 1822 along, or most proximate to, the 207° angle.

A predicted value for the pixel 1850 in the top row and the second from the left column the current block 1800 may be generated using horizontal-up-right intra-prediction, such as using a 3-tap interpolation filter centered on the available reference pixel 1834 along, or most proximate to, the 207° angle, which may include using the value of the available reference pixel 1834 along, or most proximate to, the 207° angle and the respective values of the available reference pixels 1832, 1842 adjacent to the available reference pixel 1834 along, or most proximate to, the 207° angle. Predicted values for the other pixels in the second column from the left of the current block 1800 may be similarly predicted using a 3-tap interpolation filter centered on the respective available reference pixel along the respective 207° angle. Predicted values for the other pixels in the current block 1800 may be similarly predicted using the value of the prediction pixel along, or most proximate to, the 207° angle, such as the prediction pixel in the row below the respective current pixel and in the column two columns to the left of the respective current pixel.

FIG. 19 is a flowchart diagram of an example of generating artificial neural network models 1900 in accordance with implementations of this disclosure. Generating artificial neural network models 1900 may be implemented in an encoder, such as the encoder 400 shown in FIG. 4. For example, the intra/inter prediction unit 410 of the encoder 400 shown in FIG. 4, may generating artificial neural network models 1900.

Generating artificial neural network models 1900 includes obtaining a set of coding modes at 1910, obtaining coding models at 1920, obtaining training data at 1930, obtaining a classifier model at 1940, partitioning the training data at 1950, obtaining trained coding models at 1960, and outputting the trained artificial neural network coding models at 1970.

A set of encoding modes may be obtained at 1910. Obtaining the encoding modes may include identifying an encoding mode type, such as intra-prediction coding, inter-prediction coding, compound inter-inter prediction coding, or compound inter-intra prediction coding. Obtaining the encoding modes may include identifying a cardinality (M) of the set of encoding modes for the identified encoding mode type. For example, the set of intra-prediction modes may have a defined cardinality (M), such as 64 (M=64). Obtaining the encoding modes may include identifying may include obtaining a set of quality levels (Q), such as two encoding quality levels (Q=2). Obtaining the encoding modes may include obtaining a set of coding model classes. Each coding model class may be associated with a respective encoding mode and a respective encoding quality level.

Coding models may be obtained at 1920. Obtaining the coding models may include obtaining untrained, or partially trained, coding models, such as machine learning or artificial intelligence coding models, for the coding model classes. A respective coding model may be obtained for each coding model class. The coding models may be artificial neural network models. In some embodiments, aspects of the untrained coding models, such as the artificial neural network architecture, may be specified with reference to the ad-hoc prediction models corresponding to the respective class.

Training data may be obtained at 1940. The training data may include multiple training sets, such as two million training sets, or any other number of training sets. A training set $\{x, z\}$, or vector, may include a current block (z) for encoding, such as a 4×4 block, and reference values (x), such as nine reference values. The current block (z) may correspond with an input block, such as an input block from an input frame. In some embodiments, the reference values (x) may be input pixel values, such as input pixel values proximate to, such as adjacent to or neighboring, the current block (z). For example, the reference values (x) may include input pixel values from a column immediately adjacent to the left of the current block (z), input pixel values from a row immediately adjacent above the current block (z), and an input pixel value from immediately adjacent above and to the left of the current block (z). In some embodiments, the reference values (x) may be previously encoded and reconstructed proximate to, such as adjacent to or neighboring, the current block (z). Other reference values, such as reference values below and to the left of the current block (z), reference values above and to the right of the current block (z), reference values from locations in a current input, or reconstruction, frame that are not immediately adjacent to the current block (z), may be used. In some embodiments, the training data, or a portion thereof, such as the reference vales (x) may be generated by encoding and decoding the input frames. For example, obtaining the training data may include obtaining an input portion, such as one or more input frames, of the training data, and generating a reconstructed portion of the training data by encoding the input frames to generate encoded frames, and decoding the encoded frames to generate reconstructed data on a per coding model class (M×Q) basis.

A classifier model may be obtained at 1930. The classifier model may express one or more defined rules or functions that may be used to classify an input, or training, vector $\{x, z\}$ into a coding model class from the set of coding model classes. For example, the classifier model may classify the training data by encoding one or more input frames from the training data. In an example, the classifier model may classify the training data by encoding one or more input frames from the training data using ad-hoc encoding models, such as the ad-hoc encoding models shown in FIGS. 9-18, to identify an optimal coding model class for each training set $\{x, z\}$, such as based on an optimization metric, such as SAD or SSE, which may be similar to the prediction coding described with respect to FIG. 6, except as described herein or otherwise clear from context. In some embodiments, the classifier model may classify the training data by encoding one or more input frames from the training data using previously generated artificial neural network encoding models. In some embodiments, the classifier model may be independent from the encoding models. For example, the classifier model may classify the input sets $\{x, z\}$ based on the input frame data, such as based on edge directionality and strength detected based on the input frame data for a respective input block (z).

The training data identified at 1940 may be classified, or partitioned, at 1950, such as using the classifier model obtained at 1930, such that each training set $\{x, z\}$ is classified into a respective class, corresponding to a respective prediction mode from the prediction modes identified at 1910, which may include generating M subsets of the training data, each subset of the training data corresponding to a respective class. In some embodiments, partitioning the training data may include generating MQ subsets of the training data, each subset corresponding to a combination of a prediction mode M and a quality level Q.

Trained coding models may be obtained at 1960, which may include training the coding models obtained at 1920 based on the training data obtained at 1940 and partitioned at 1950, such as using neural network regression. Each coding model may be trained using the training data from the subset, or partition, of training data associated with the respective coding model class.

Training a coding model may include identifying a training set $\{x, z\}$ from the training data corresponding to a respective class, inputting the reference values (x) from the training set $\{x, z\}$ into the artificial neural network coding model, obtaining a prediction block ($z_p$) output by the artificial neural network coding model in response to the input reference values (x), determining an accuracy metric, such as a sum of absolute differences (SAD) or a sum of square errors (SSE), indicating a difference between the prediction block ($z_p$) and the input block (z) from the training set $\{x, z\}$, and automatically updating one or more weights, thresholds, or other configurable parameters described or defined by the artificial neural network model to improve the accuracy of the artificial neural network. Training a coding model may include iteratively training the coding model based on each training set $\{x, z\}$ from the training data corresponding to a respective class.

Obtaining the trained coding models at 1960 may include determining whether defined convergence criteria are satisfied, and, iteratively repeating obtaining training data at 1930, obtaining the classifier model at 1940, partitioning the training data at 1950, and obtaining trained coding models at 1960, such that the defined convergence criteria are satisfied, as indicated by the broken directional line at 1965.

Obtaining the training data at 1930 subsequent to determining whether defined convergence criteria are satisfied at 1965 may include regenerating the training data by encoding the input training data based on the partially trained coding models obtained at 1960 in the previous iteration. In some implementations, obtaining the training data at 1930 subsequent to determining whether defined convergence criteria are satisfied at 1965 may be omitted and each training iteration may include partitioning the training data at 1950 and obtaining trained coding models at 1960 based on the training data identified in accordance with the first iteration. In some embodiments, obtaining the training data at 1930 may include obtaining different training data, or partially different training data for each iteration.

In some embodiments, obtaining the classifier model at 1940 may include obtaining a first classifier model for a first training iteration, such as a first classifier model based on the ad-hoc prediction models or a first classifier model based on the input data, and obtaining a second classifier model based on the partially trained artificial neural network models for iterations subsequent to the first iteration.

In some embodiments, the defined convergence criteria may include an inter-iteration minimum classification variance metric. For example, the inter-iteration minimum classification variance metric may indicate a minimum cardinality of differences in the partitioned training data subsets. For example, the cardinality of training set classifications for a current iteration that differs from the training set classifications from an immediately preceding iteration may be below the inter-iteration minimum classification variance metric and the artificial neural network models trained in accordance with the current iteration may be identified as the trained artificial neural network models, which may be output, such as stored, at 1970. Outputting the trained artificial neural network models at 1970 may include outputting, such as storing, the artificial neural network model architecture and parameters, such as weights, for each model. In an example, outputting the trained artificial neural network models at 1970 may include outputting, such as storing, respective sets of non-linear functions, such as high dimensional non-linear functions, representing, or generated by, the corresponding machine learning prediction coding model.

As used herein, the terms "optimal", "optimized", "optimization", or other forms thereof, are relative to a respective context and are not indicative of absolute theoretic optimization unless expressly specified herein.

The words "example" or "exemplary" are used herein to mean serving as an example, instance, or illustration. Any aspect or design described herein as "example" or "exemplary" not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, one or more elements of the methods described herein may be omitted from implementations of methods in accordance with the disclosed subject matter.

The implementations of the transmitting computing and communication device 100A and/or the receiving computing and communication device 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting computing and communication device 100A and the receiving computing and communication device 100B do not necessarily have to be implemented in the same manner.

Further, in one implementation, for example, the transmitting computing and communication device 100A or the receiving computing and communication device 100B can be implemented using a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

The transmitting computing and communication device 100A and receiving computing and communication device 100B can, for example, be implemented on computers in a real-time video system. Alternatively, the transmitting computing and communication device 100A can be implemented on a server and the receiving computing and communication device 100B can be implemented on a device separate from the server, such as a hand-held communications device. In this instance, the transmitting computing and communication device 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting computing and communication device 100A. Other suitable transmitting computing and communication device 100A and receiving computing and communication device 100B implementation schemes are available. For example, the receiving computing and communication device 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method comprising:
    generating, by a processor, a decoded frame by decoding a current frame from an encoded bitstream, wherein decoding includes:
        identifying a current encoded block from the current frame;
        identifying a prediction coding model for the current block, wherein the prediction coding model is a machine learning prediction coding model from a plurality of machine learning prediction coding models;
        identifying reference values for decoding the current block based on the prediction coding model;
        obtaining prediction values based on the prediction coding model and the reference values;
        generating a decoded block corresponding to the current encoded block based on the prediction values; and
        including the decoded block in the decoded frame; and
    outputting a reconstructed frame based on the decoded frame.

2. The method of claim 1, wherein:
    identifying the prediction coding model includes identifying a set of non-linear functions representing the machine learning prediction coding model; and
    obtaining the prediction values includes obtaining the prediction values using at least one non-linear function from the set of non-linear functions.

3. The method of claim 1, wherein decoding includes:
    decoding a prediction coding model identifier from the encoded bitstream, the prediction coding model identifier indicating the prediction coding model; and
    identifying the prediction coding model based on the prediction coding model identifier.

4. The method of claim 3, wherein decoding includes:
    identifying a quality level for decoding the current frame; and
    identifying the prediction coding model based on the prediction coding model identifier and the quality level.

5. The method of claim 1, wherein identifying the prediction coding model includes identifying a prediction coding type, wherein the prediction coding type is an intra-prediction coding type, an inter-prediction coding type, or a compound prediction coding type.

6. The method of claim 1, wherein the prediction coding model is an intra-prediction coding model from a plurality of intra-prediction coding models.

7. The method of claim 1, wherein obtaining the prediction values includes:
    using the reference values as input values for an artificial neural network corresponding to the prediction coding model such that the prediction values are output by the artificial neural network in response to the reference values.

8. The method of claim 1, wherein identifying the prediction coding model includes:
    identifying a trained prediction coding model from a plurality of trained prediction coding models, trained by:
        identifying a prediction coding type, wherein the prediction coding type is an intra-prediction coding type, an inter-prediction coding type, or a compound prediction coding type;
        identifying a plurality of prediction coding modes associated with the prediction coding type, the plurality of prediction coding modes having a defined cardinality;
        identifying a plurality of prediction coding models such that each prediction coding mode from the plurality of prediction coding modes is associated with a respective prediction coding model from the plurality of prediction coding models; and
        obtaining the plurality of trained prediction coding models by training the prediction coding type using the plurality of prediction coding models as current prediction coding models; and
    identifying the trained prediction coding model as the prediction coding model.

9. The method of claim 8, wherein training the prediction coding type includes:
    obtaining partially trained prediction coding models by training the current prediction coding models;
    determining whether a convergence criterion for the prediction coding type is satisfied based on the partially trained prediction coding models;
    in response to a determination that the convergence criterion for the prediction coding type is satisfied, identifying the partially trained prediction coding models as the plurality of trained prediction coding models; and
    in response to a determination that the convergence criterion for the prediction coding type is unsatisfied, training the prediction coding type using the partially trained prediction coding models as the current prediction coding models.

10. The method of claim 9, wherein training the current prediction coding models includes:
    obtaining training data, the training data including a plurality of training data sets, each training data set including a respective plurality of reference values and a respective block of input pixel values;
    obtaining a classifier for partitioning the training data;
    obtaining a plurality of training data partitions by partitioning the training data using the classifier, wherein partitioning the training data using the classifier includes obtaining the plurality of training data partitions wherein each training data set from the plurality of training data sets is included in a respective training data partition from the plurality of training data partitions in accordance with the classifier, and wherein each training data partition from the plurality of training data partitions is associated with a respective prediction coding mode from the plurality of prediction coding modes;

for each prediction coding mode from the plurality of prediction coding modes:
  obtaining a set of internal parameter values for a current prediction coding model from the current prediction coding models, the current prediction coding model corresponding to the prediction coding mode;
  for each training data set from the corresponding training data partition:
    obtaining prediction values output based on the current prediction coding model in response to reference values from the current training data set, wherein obtaining the prediction values includes using the set of internal parameter values as current internal parameter values;
    determining an accuracy metric based on a difference between the prediction values and input pixel values from the current training data set;
    generating an updated set of internal parameter values based on the current internal parameter values and the accuracy metric; and
    identifying the updated set of internal parameter values as the set of internal parameter values.

11. The method of claim 10, wherein:
on a condition that the current prediction coding models are untrained prediction coding models, obtaining the classifier includes identifying a first classifier as the classifier; and
on a condition that the current prediction coding models are partially trained prediction coding models, obtaining the classifier includes identifying a second classifier as the classifier.

12. The method of claim 11, wherein identifying the first classifier includes:
identifying the first classifier such that the first classifier classifies a respective training data set based on encoding the respective training data set using ad-hoc prediction coding models that differ from the machine learning prediction coding models.

13. The method of claim 12, wherein identifying the second classifier includes identifying the second classifier such that the second classifier classifies a respective training data set based on encoding the respective training data set using the partially trained prediction coding models.

14. The method of claim 10, wherein determining whether the convergence criterion for the prediction coding type is satisfied includes:
in response to a determination that the current prediction coding models are untrained prediction coding models, determining that the convergence criterion for the prediction coding type is unsatisfied;
in response to a determination that the current prediction coding models are partially trained prediction coding models:
  determining a cardinality of differences between the plurality of training data partitions and a previously generated plurality of training data partitions;
  in response to a determination that the cardinality of differences is at least a minimum variance threshold, determining that the convergence criterion for the prediction coding type is unsatisfied; and
  in response to a determination that the minimum variance threshold exceeds the cardinality of differences, determining that the convergence criterion for the prediction coding type is satisfied.

15. A method comprising:
generating, by a processor, a decoded frame by decoding a current frame from an encoded bitstream, wherein decoding includes:
  identifying a current encoded block from the current frame;
  decoding a prediction coding model identifier from the encoded bitstream;
  identifying a prediction coding model for the current block based on the prediction coding model identifier, wherein the prediction coding model is a machine learning prediction coding model from a plurality of machine learning prediction coding models;
  identifying reference values for decoding the current block based on the prediction coding model;
  obtaining prediction values based on the prediction coding model and the reference values by using the reference values as input values for an artificial neural network corresponding to the prediction coding model such that the prediction values are output by the artificial neural network in response to the reference values;
  generating a decoded block corresponding to the current encoded block based on the prediction values; and
  including the decoded block in the decoded frame; and
outputting a reconstructed frame based on the decoded frame.

16. The method of claim 15, wherein identifying the prediction coding model includes:
identifying a trained prediction coding model from a plurality of trained prediction coding models, trained by:
  identifying a prediction coding type, wherein the prediction coding type is an intra-prediction coding type, an inter-prediction coding type, or a compound prediction coding type;
  identifying a plurality of prediction coding modes associated with the prediction coding type, the plurality of prediction coding modes having a defined cardinality;
  identifying a plurality of prediction coding models such that each prediction coding mode from the plurality of prediction coding modes is associated with a respective prediction coding model from the plurality of prediction coding models; and
  obtaining the plurality of trained prediction coding models by training the prediction coding type using the plurality of prediction coding models as current prediction coding models; and
identifying the trained prediction coding model as the prediction coding model.

17. The method of claim 16, wherein training the prediction coding type includes:
obtaining partially trained prediction coding models by training the current prediction coding models;
determining whether a convergence criterion for the prediction coding type is satisfied based on the partially trained prediction coding models;
in response to a determination that the convergence criterion for the prediction coding type is satisfied, identifying the partially trained prediction coding models as the plurality of trained prediction coding models; and in response to a determination that the convergence criterion for the prediction coding type is unsatisfied, training the prediction coding type using the partially trained prediction coding models as the current prediction coding models.

18. The method of claim 17, wherein training the current prediction coding models includes:
obtaining training data, the training data including a plurality of training data sets, each training data set including a respective plurality of reference values and a respective block of input pixel values;
obtaining a classifier for partitioning the training data;
obtaining a plurality of training data partitions by partitioning the training data using the classifier, wherein partitioning the training data using the classifier includes obtaining a plurality of training data partitions wherein each training data set from the plurality of training data sets is included in a respective training data partition from the plurality of training data partitions in accordance with the classifier, and wherein each training data partition from the plurality of training data partitions is associated with a respective prediction coding mode from the plurality of prediction coding modes;
for each prediction coding mode from the plurality of prediction coding modes:
obtaining a set of internal parameter values for a current prediction coding model from the current prediction coding models, the current prediction coding model corresponding to the prediction coding mode;
for each training data set from the corresponding training data partition:
obtaining prediction values output based on the current prediction coding model in response to reference values from the current training data set, wherein obtaining the prediction values includes using the set of internal parameter values as current internal parameter values;
determining an accuracy metric based on a difference between the prediction values and input pixel values from the current training data set;
generating an updated set of internal parameter values based on the current internal parameter values and the accuracy metric; and
identifying the updated set of internal parameter values as the set of internal parameter values.

19. The method of claim 18, wherein:
on a condition that the current prediction coding models are untrained prediction coding models, obtaining the classifier includes identifying a first classifier as the classifier, wherein identifying the first classifier includes:
identifying the first classifier such that the first classifier classifies a respective training data set based on encoding the respective training data set using ad-hoc prediction coding models that differ from the machine learning prediction coding models; or
identifying the first classifier such that the first classifier classifies the respective training data set based on the input pixel values from the respective training data set; and on a condition that the current prediction coding models are partially trained prediction coding models, obtaining the classifier includes identifying a second classifier as the classifier, wherein identifying the second classifier includes identifying the second classifier such that the second classifier classifies a respective training data set based on encoding the respective training data set using the partially trained prediction coding models.

20. The method of claim 18, wherein determining whether the convergence criterion for the prediction coding type is satisfied includes:
in response to a determination that the current prediction coding models are untrained prediction coding models, determining that the convergence criterion for the prediction coding type is unsatisfied;
in response to a determination that the current prediction coding models are partially trained prediction coding models:
determining a cardinality of differences between the plurality of training data partitions and a previously generated plurality of training data partitions;
in response to a determination that the cardinality of differences is at least a minimum variance threshold, determining that the convergence criterion for the prediction coding type is unsatisfied; and
in response to a determination that the minimum variance threshold exceeds the cardinality of differences, determining that the convergence criterion for the prediction coding type is satisfied.

21. An apparatus comprising:
a processor configured to:
generate a decoded frame by decoding a current frame from an encoded bitstream, wherein decoding includes:
identifying a current encoded block from the current frame;
identifying a prediction coding model for the current block, wherein the prediction coding model is a machine learning prediction coding model from a plurality of previously defined machine learning prediction coding models;
identifying reference values for decoding the current block based on the prediction coding model;
obtaining prediction values based on the prediction coding model and the reference values;
generating a decoded block corresponding to the current encoded block based on the prediction values; and
including the decoded block in the decoded frame; and
output a reconstructed frame based on the decoded frame.

22. The apparatus of claim 21, wherein:
identifying the prediction coding model includes identifying a set of non-linear functions representing the machine learning prediction coding model; and
obtaining the prediction values includes obtaining the prediction values using at least one non-linear function from the set of non-linear functions.

23. The method of claim 10, wherein the training data omits the current block.

24. The method of claim 18, wherein the training data omits the current block.

* * * * *